(12) United States Patent
Mouri et al.

(10) Patent No.: US 7,841,178 B2
(45) Date of Patent: Nov. 30, 2010

(54) MASTER CYLINDER

(75) Inventors: Tomonori Mouri, Kai (JP); Naganori Koshimizu, Kai (JP)

(73) Assignee: Hitachi, Ltd., Tokyo (JP)

( * ) Notice: Subject to any disclaimer, the term of this patent is extended or adjusted under 35 U.S.C. 154(b) by 454 days.

(21) Appl. No.: 12/073,977

(22) Filed: Mar. 12, 2008

(65) Prior Publication Data

US 2008/0223034 A1 Sep. 18, 2008

(30) Foreign Application Priority Data

Mar. 16, 2007 (JP) .............................. 2007-068770

(51) Int. Cl.
*F15B 7/04* (2006.01)
*B60T 11/228* (2006.01)

(52) U.S. Cl. .......................................... 60/578; 60/588
(58) Field of Classification Search .................. 60/578, 60/588
See application file for complete search history.

(56) References Cited

U.S. PATENT DOCUMENTS 5,557,935 A * 9/1996 Ganzel ........................ 60/578
6,082,831 A * 7/2000 Hageman et al. ............... 60/578
6,698,202 B2 * 3/2004 Ogiwara et al. ................ 60/578
6,840,043 B2 * 1/2005 Ogiwara et al. ................ 60/578

FOREIGN PATENT DOCUMENTS

JP 2002-321609 11/2002

* cited by examiner

*Primary Examiner*—Michael Leslie
(74) *Attorney, Agent, or Firm*—Wenderoth, Lind & Ponack, L.L.P.

(57) ABSTRACT

A master cylinder comprising a large diameter pressurizing chamber and a small diameter hydraulic chamber, a control valve device in which a control valve body releases a hydraulic pressure in the large diameter pressurizing chamber to a reservoir side such that the hydraulic pressure in the large diameter pressurizing chamber is gradually reduced in accordance with a rise in a hydraulic pressure in the small hydraulic chamber, and a check valve device comprising a check valve chamber communicating with an relief passage, which releases a hydraulic pressure in the large diameter pressurizing chamber to the reservoir via the control valve device, and with a small diameter hydraulic chamber, respectively, and a check valve body accommodated in the check valve chamber for permitting flow of a brake fluid from the relief passage to the small hydraulic chamber, and for preventing flow of the brake fluid in a reverse direction.

14 Claims, 7 Drawing Sheets

MASTER CYLINDER

BACKGROUND OF THE INVENTION

The present invention relates to a master cylinder for supplying a brake fluid to a brake apparatus of an automobile or the like.

According to a master cylinder of a related art, there is provided a constitution in which by supplying a large volume of a brake fluid at an initial stage of operation (carrying out a so-called fast fill) when the brake fluid is supplied to a brake apparatus such as a disk brake or a drum brake, an ineffective fluid amount at an initial stage of a stroke is compensated for, and as a result, a pedal stroke can be shortened.

The master cylinder is provided with a stepped cylinder having a large diameter cylinder portion and a small diameter cylinder portion; a stepped piston having a large diameter piston portion slidably inserted into the large diameter cylinder portion of the stepped cylinder and a small diameter piston portion slidably inserted into the small diameter cylinder portion of the stepped cylinder; and a reverse-flow-checking opening and closing portion for partitioning the inside of the stepped cylinder into a large diameter pressurizing chamber on the large diameter piston portion side and a small diameter hydraulic chamber communicating with a brake apparatus on the small diameter piston portion side, and permitting flow of the brake fluid only from the large diameter pressurizing chamber side to the small diameter hydraulic chamber side, wherein when a volume of the large diameter pressurizing chamber is reduced by a sliding movement of the stepped piston toward the small diameter hydraulic chamber side, the reverse-flow-checking opening and closing portion is opened to supply the fluid from the large diameter pressurizing chamber side to the small diameter hydraulic chamber side.

The master cylinder is provided with a control valve device for opening the reverse-flow-checking opening and closing portion in response to a reduction in a volume of the large diameter pressurizing chamber caused by the sliding movement of the stepped piston toward the small diameter hydraulic chamber side to thereby supply the fluid from the large diameter pressurizing chamber side to the small diameter hydraulic chamber side, and for releasing a hydraulic pressure in the large diameter pressurizing chamber to a reservoir side such that the hydraulic pressure in the large diameter pressurizing chamber is gradually reduced in accordance with a rise in a hydraulic pressure in the small diameter hydraulic chamber (for example, refer to A Japanese Patent Laid-Open Publication No. 2002-321609).

SUMMARY OF THE INVENTION

A VDC (Vehicle Dynamics Control) system which controls vehicle behavior by controlling a brake force to be applied to each wheel has been recently employed in motor vehicles. According to the VDC system, a brake fluid is sucked from a small diameter hydraulic chamber of a master cylinder with a pump to thereby generate a brake hydraulic pressure so that the brake force applied to each vehicle wheel can be controlled by controlling the brake hydraulic pressure.

During pumping up with the pump of the VDC system connected to the small diameter hydraulic chamber, a fluid volume of the above fast fill type master cylinder may become insufficient due to the existence of an orifice arranged between the reservoir and the small diameter hydraulic chamber. To address this problem, it has been contemplated to provide a bypass connection between the reservoir and the small diameter hydraulic chamber, and additionally to arrange a check valve device at a bypass passage. However, by providing such a bypass connection, even in a simple manner, a constitution of the passage becomes complicated. As a result, a number of manufacturing processes is increased, and productivity deteriorates.

An object of the present invention is to provide a master cylinder such that, even in a case that a check valve device is provided, an increase in a number of manufacturing processes is limited by simplifying a passage arrangement so as to be able to improve the productivity.

The present invention provides a master cylinder comprising:

a stepped cylinder having a large diameter cylinder portion and a small diameter cylinder portion;

a stepped piston having a large diameter piston portion slidably inserted into the large diameter cylinder portion of the stepped cylinder and a small diameter piston portion slidably inserted into the small diameter cylinder portion of the stepped cylinder;

a reverse-flow-checking opening and closing portion for partitioning an inside of the stepped cylinder into a large diameter pressurizing chamber on a large diameter piston portion side and a small diameter hydraulic chamber on a small diameter piston portion side, and permitting flow of a brake fluid only from the large diameter pressurizing chamber side to the small diameter hydraulic chamber side;

a control valve device connecting with the large diameter pressurizing chamber, the small diameter hydraulic chamber and a reservoir, wherein a control valve body releasing a hydraulic pressure in the large diameter pressurizing chamber to the reservoir side such that the hydraulic pressure in the large diameter pressurizing chamber is reduced gradually in accordance with a rise in a hydraulic pressure in the small diameter hydraulic chamber; and a check valve device having a check valve chamber for communicating with a relief passage to release the hydraulic pressure in the large diameter pressurizing chamber via the control valve device to the reservoir and with the small diameter hydraulic chamber, respectively, and a check valve body accommodated in the check valve chamber for permitting flow of the brake fluid from the relief passage to the small diameter hydraulic chamber while preventing flow of the brake fluid in a reverse direction.

A moving direction of the control valve body of the control valve device may intersect with a direction of movement of the check valve body of the check valve device.

A small diameter hydraulic passage connecting the small diameter hydraulic chamber with the control valve device may communicate with the check valve chamber.

A direction of movement of the control valve body of the control valve device may be a horizontal direction, and a direction of movement of the check valve body of the check valve device may be a vertical direction.

The check valve chamber of the check valve device may be provided at a lower side in a vertical direction relative to the control valve device.

Alternatively, the check valve chamber of the check valve device may be provided at an upper side in a vertical direction relative to the control valve device.

A part of the relief passage may be provided in a vertical direction.

A casing of the check valve device and a casing of the control valve device may be integrally formed with the stepped cylinder.

The control valve device may have the control valve chamber connecting with the relief passage and accommodating the control valve body. Further, a communication passage providing communication between the relief passage and the check valve chamber may be connected to the relief passage via the control valve chamber.

A part of the communication passage and the relief passage may be a straight passage passing through the control valve chamber and the check valve chamber.

The check valve chamber of the check valve device may have an opening portion which is opened at its lower side in a vertical direction. The opening portion may be closed by a cap body. A part of the small diameter hydraulic pressure passage may be a straight passage connecting the check valve chamber and the small diameter hydraulic chamber. An extension of the straight passage can be located in a space of the opening portion.

The present invention provides a master cylinder comprising:
  a stepped cylinder having a large diameter cylinder portion and a small diameter cylinder portion;
  a stepped piston having a large diameter piston portion slidably inserted into the large diameter cylinder portion of the stepped cylinder and a small diameter piston portion slidably inserted into the small diameter cylinder portion of the stepped cylinder;
  a reverse-flow-checking opening and closing portion for partitioning an inside of the stepped cylinder into a large diameter pressurizing chamber on a large diameter piston portion side and a small diameter hydraulic chamber on a small diameter piston portion side, and permitting flow of the brake fluid only from the large diameter pressurizing chamber side to the small diameter hydraulic chamber side;
  a control valve device connecting with the large diameter pressurizing chamber, the small diameter hydraulic chamber, and a reservoir, and releasing by a control valve body a hydraulic pressure in the large diameter pressurizing chamber to the reservoir side such that the hydraulic pressure in the large diameter pressurizing chamber is gradually reduced in accordance with a rise in a hydraulic pressure in the small diameter hydraulic chamber; and
  a check valve device having a check valve chamber for communicating with a small diameter hydraulic passage connecting the small diameter hydraulic chamber to the control valve device, and with the reservoir, respectively, and a check valve body accommodated in the check valve chamber for permitting flow of the brake fluid from the reservoir side to the small diameter hydraulic passage, while preventing flow of the brake fluid in a reverse direction.

The control valve device may have a control pressure chamber connecting with the small diameter hydraulic passage and applying a pressure to the control valve body in a valve opening direction. The small diameter hydraulic passage connecting the control pressure chamber to the small diameter hydraulic chamber may provide communication via the check valve chamber.

A part of the small diameter hydraulic passage can be a straight passage passing through the control pressure chamber and the check valve chamber.

DETAILED DESCRIPTION OF THE PREFERRED EMBODIMENTS

Explanation will now be given of a master cylinder according to a first embodiment of the present invention with reference to FIG. 1 through FIG. 9. The explanation given below is made assuming a condition where a master cylinder is mounted on a vehicle (a vehicle mounted condition).

Figure 1:
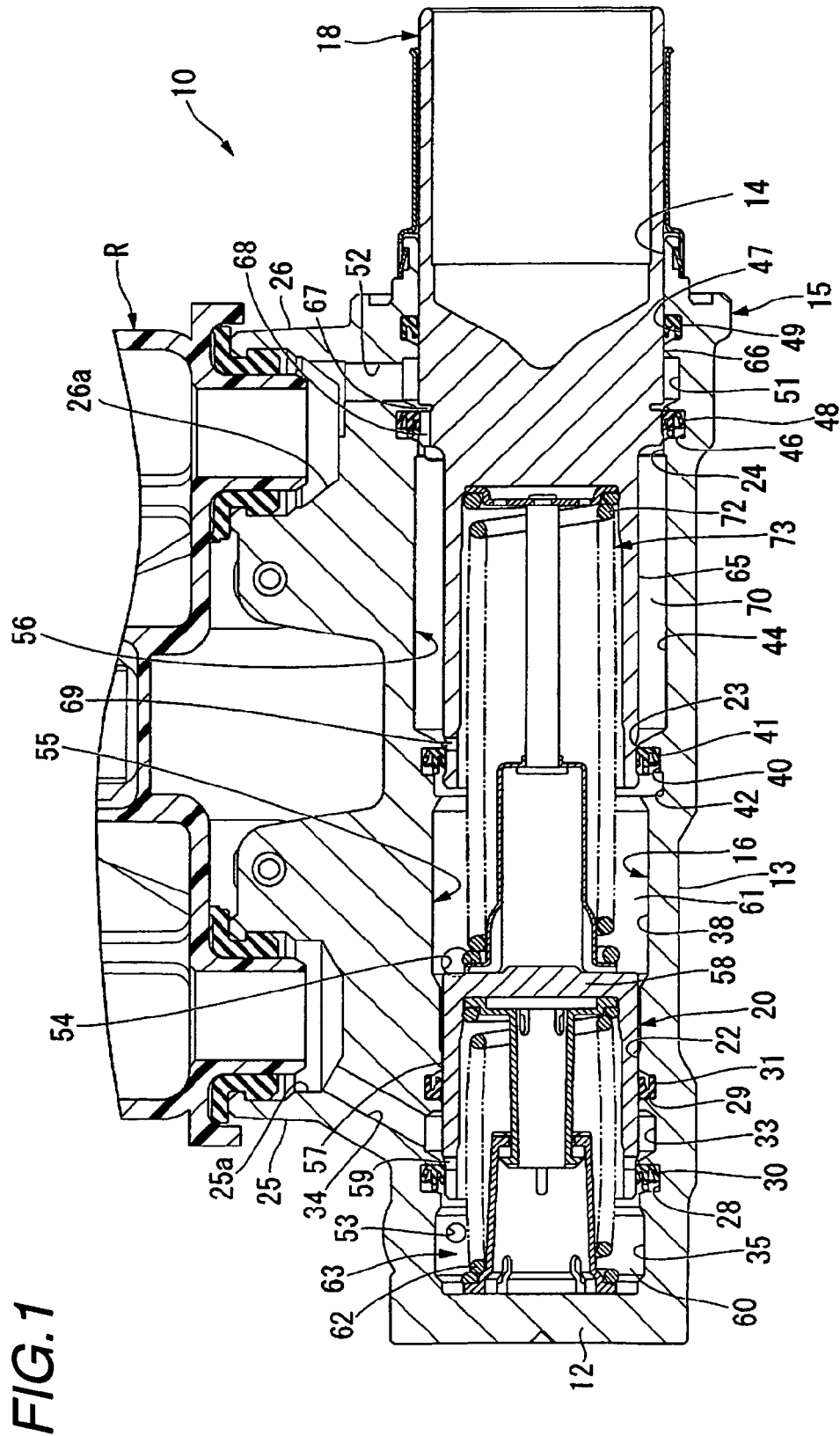
FIG. 1 is a main sectional view showing a master cylinder according to a first embodiment of the present invention.

First, with reference to FIG. 1, a basic constitution of a master cylinder 10 according to a first embodiment will be described. The master cylinder 10 is a so-called plunger type master cylinder, and is constructed to enable a brake hydraulic pressure to be generated therein for introduction into a brake apparatus, such as a disc brake and the like, upon depressing of an output shaft of a booster (not shown), which is moved by operation of a brake pedal or the like.

The master cylinder 10 is of a tandem type, comprising a cylinder body (stepped cylinder) 15 in a shape of a bottomed cylinder having a bottom portion 12 and a cylinder portion 13, and adapted to be attached to a booster(not shown) at a side of an opening portion 14; a primary piston (stepped piston) 18 operatively inserted into a bore 16 of the cylinder body 15 on the opening portion 14 side thereof so as to be slidable along an axis of the cylinder portion 13 (hereinafter, cylinder axis); and a secondary piston 20 operatively inserted into the bore 16 of the cylinder body 15 on a bottom portion 12 side thereof with respect to the primary piston 18 so as to be slidable in the direction of the cylinder axis. It is to be noted that in the present embodiment, the cylinder axis is arranged to be horizontal.

Herein, a bore side of the cylinder portion 13 is provided with a first small diameter slide bore portion 22 formed on the bottom portion 12 side. A second small diameter slide bore portion 23 is formed in a middle area. A large diameter slide bore portion 24 having a larger diameter than those of the first small diameter slide bore portion 22 and the second small diameter slide bore portion 23 is formed on the opening portion 14 side. Then the secondary piston 20 is slidably guided by the first small diameter slide bore portion 22, and the primary piston 18 is always slidably guided by the large diameter slide bore portion 24, and may also be slidably guided by the second small diameter slide bore portion 23 depending on a location of the primary piston.

The cylinder body 15 is provided with mounting pedestals 25 and 26 at two places, which are formed integrally with the cylinder body 15 protruding outward in the direction of the diameter of the cylinder portion 13 (hereinafter, cylinder diameter direction). In particular, the mounting pedestals 25 and 26 protrude upward therefrom at the same positions in a circumferential direction of the cylinder portion 13 (hereinafter, cylinder circumferential direction), and define a space therebetween in the cylinder axis direction. The mounting pedestals 25 and 26 are respectively provided with mounting holes 25a and 26a, to which a reservoir R is mounted.

The first small diameter slide bore portion 22 of the cylinder body 15 is provided with plural annular seal circumferential grooves which are formed to define a space therebetween in the cylinder axis direction. In particular, two annular seal circumferential grooves 28 and 29 are formed in the first small diameter slide bore portion 22. The annular seal circumferential grooves 28 and 29 are recessed outward in the cylinder diameter direction. The annular seal circumferential groove 28 is formed on a side of the bottom portion 12, and the annular seal circumferential groove 29 is formed on a side of the opening portion 14 away from the bottom portion 12 with respect to the annular seal circumferential groove 28. A seal ring 30 or a cup seal having an E-shaped section is fitted into the seal circumferential groove 28 on the bottom portion 12 side, with a lip side thereof disposed toward the bottom portion 12 side. Similarly, a seal ring 31 or a cup seal having a C-shaped section is fitted into the seal circumferential groove 29 on the opening portion 14 side, with a lip side thereof disposed toward the opening portion 14 side.

The first small diameter slide bore portion 22 is further provided with an annular open groove 33 recessed outward in the cylinder diameter direction and formed between the seal circumferential groove 28 and the seal circumferential grooves 29. The open groove 33 communicates with a communication hole 34. The communication hole 34 opens to the mounting hole 25a on the bottom portion 12 side, and is in constant communication with the reservoir R. It is to be noted that a bottom side large diameter bore portion 35 having a slightly larger diameter as compared with the first small diameter slide bore portion 22 is formed on the bore of the cylinder body 15 in the bottom portion 12 side with respect to the seal circumferential groove 28.

A middle part large diameter bore portion 38 having a slightly larger diameter as compared with the first small diameter slide bore portion 22 and the second small diameter slide bore portion. 23 is formed on the bore of the cylinder body 15 between the first small diameter slide bore portion 22 and the second small diameter slide bore portion 23.

The second small diameter slide bore portion 23 is provided with an annular seal circumferential groove 40 recessed outward in the cylinder diameter direction. A seal ring (a reverse-flow-checking opening and closing portion) 41 or a cup seal with an E-shaped section is fitted into the seal circumferential groove 40, with a lip side thereof disposed toward the bottom portion 12 side.

An eccentric groove 42 connecting the seal circumferential groove 40 with the middle part large diameter bore portion 38 is formed on the second small diameter slide bore portion 23 in its middle part large diameter bore portion 38 side, so as to be recessed outward in the cylinder diameter direction. The eccentric groove 42 has a smaller diameter than that of the second small diameter slide bore portion 23. The eccentric groove 42 is formed of a circular arc centering on an axis which is offset from and parallel to a center axis of the second small diameter slide bore portion 23.

An opening side large diameter bore portion 44 is formed on the bore of the cylinder body 15 in a location between the second small diameter slide bore portion 23 and the large diameter slide bore portion 24. The diameter of opening side large diameter bore portion 44 is larger than those of the second small diameter slide bore portion 23 and the large diameter slide bore portion 24, and is also larger than those of the bottom side large diameter inside diameter portion 35 and the middle part large diameter bore portion 38.

The large diameter slide bore portion 24 of the cylinder body 15 is provided with annular seal circumferential grooves 46 and 47 at plural places, for example at two places, which are formed with a certain space placed therebetween in the cylinder axis direction. The seal circumferential grooves 46 and 47 are recessed outward in the cylinder diameter direction and arranged in this order from the bottom portion 12 side. A seal ring 48 or a cup seal having an E-shaped section is fitted into the seal circumferential groove 46 on the bottom portion 12 side, with a lip side thereof disposed toward the bottom portion 12 side. Similarly, a seal ring 49 or a cup seal having a C-shaped section is fitted into the seal circumferential groove 47 on the opening portion 14 side, with a lip side thereof disposed toward the bottom portion 12 side.

The large diameter slide bore portion 24 is further provided with an annular open groove 51 recessed outward in the cylinder diameter direction and formed between the seal circumferential groove 46 and the seal circumferential grooves 47. The open groove 51 communicates with a communication hole 52. The communication hole 52 opens to the mounting hole 26a on the opening portion 14 side, to be in constant communication with the reservoir R.

A secondary discharge passage 53 and a primary discharge passage 54 are formed in a side portion of the cylinder portion 13 of the cylinder body 15. Brake pipes (not shown) are connected to the secondary discharge passage 53 and the primary discharge passage 54 to supply brake fluid to brake calipers (not shown).

Herein, the cylinder body 15 comprises a small diameter cylinder portion 55 and a large diameter cylinder portion 56 having as a whole a larger diameter than that of the small diameter cylinder portion 55. The small diameter cylinder portion 55 comprises the bottom side large diameter bore portion 35, the first small diameter slide bore portion 22, the middle part large diameter bore portion 38, and the second small diameter slide bore portion 23. The large diameter cylinder portion 56 comprises the opening side large diameter bore portion 44 and the large diameter slide bore portion 24.

The secondary piston 20, which is to be fitted in the bore of the cylinder body 15 at the bottom portion 12 side thereof, is formed of a bottomed cylinder shape having a cylinder portion 57 and a bottom portion 58 formed on one side in the axial direction of the cylinder portion 57, and is slidably fitted into the first small diameter slide bore portion 22 of the cylinder body 15 with the cylinder portion 57 arranged in the bottom portion 12 side. A plurality of ports 59 is formed in the cylinder portion 57 at its end portion remote or opposite from the bottom portion 58, extending radially therethrough in the cylinder diameter direction.

The master cylinder 10 is further provided with a secondary hydraulic chamber 60 for supplying hydraulic fluid to the secondary discharge passage 53, and the secondary hydraulic chamber 60 is surrounded by the bottom portion 12 of the cylinder body 15 and the secondary piston 20, and is sealed with the seal ring 30. The secondary hydraulic chamber 60 communicates with the reservoir R when the secondary piston 20 is in such a position as to make the port 59 open to the open groove 33.

The sealing ring 30 fitted in the seal circumferential groove 28 on the bottom portion 12 side of the cylinder body 15 is brought into slidable contact at its inner circumference with an outer circumference side of the secondary piston 20. With this arrangement, when the secondary piston 20 is in a position where the port 59 is located in the bottom portion 12 side with respect to the seal ring 30, the seal ring 30 is capable of preventing communication between the secondary hydraulic chamber 60 and the reservoir R, and permitting flow of brake fluid only from the reservoir R side to the secondary hydraulic chamber 60 side when a pressure difference occurs therebetween. Further, the seal ring 31 fitted in the seal circumferential groove 29 of the cylinder body 15 is brought into slidable contact at its inner circumference with an outer circumference side of the secondary piston 20, to thereby prevent communication between the open groove 33 communicating with the reservoir R and a primary hydraulic chamber 61, which will be described later.

An interval regulator 63 including a secondary piston spring 62 is provided between a bottom portion 58 of the secondary piston 20 and the bottom portion 12 of the cylinder body 15 so as to define an interval therebetween during a standby state with no input applied from a booster side.

The primary piston 18, which is to be fitted in the bore of the cylinder body 15 at the opening portion 14 side thereof, is formed to have a stepped contour shape with a small diameter piston portion 65 provided on one side in its axial direction and a large diameter piston portion 66, which has a larger diameter than that of the former, provided on the other side in its axial direction, and further is formed to be cylindrical at both ends in respective axial directions. An annular groove 67 is formed on the large diameter piston portion 66 at the small diameter piston portion 65 side thereof. A plurality of communicating grooves 68 extending along the axial direction is formed on the large diameter piston portion 66 in the small diameter piston portion 65 side thereof with respect to the annular groove 67. The small diameter piston portion 65 is slidably inserted into the second small diameter slide bore portion 23 of the small diameter cylinder portion 55 in the cylinder body 15. The large diameter piston portion 66 is slidably inserted into the large diameter slide bore portion 24 of the large diameter cylinder portion 56 in the cylinder body 15.

A plurality of ports 69 is formed in a cylinder shape portion of the small diameter piston portion 65 at its end portion remote or opposite from the large diameter piston portion 66, extending radially therethrough in the cylinder diameter direction.

The master cylinder 10 is further provided with a primary hydraulic chamber (small diameter hydraulic chamber) 61 for supplying hydraulic fluid to the primary discharge passage 54. The primary hydraulic chamber (small diameter hydraulic chamber) 61 is surrounded by a part of the cylinder body 15 between the first small diameter slide bore portion 22 and the second small diameter slide bore portion 23, the primary piston 18, and the secondary piston 20, and is sealed with the seal ring 31 and seal ring 41.

Further, the master cylinder 10 is provided with a large diameter pressurizing chamber 70, which has a larger diameter than that of the primary hydraulic chamber 61. The large diameter pressurizing chamber 70 is surrounded by a bore portion between the second small diameter slide bore portion 23 and the large diameter slide bore portion 24, and the primary piston 18, and is sealed with the seal ring 41 and the seal ring 48. The primary hydraulic chamber 61 is in communication with the large diameter pressurizing chamber 70 when the primary piston 18 is in such a position as to make the port 69 open to the large diameter pressurizing chamber 70.

The seal ring 41 provided in the second small diameter slide bore portion 23 of the cylinder body 15 is brought into slidable contact at its inner circumference with the outer circumference side of the primary piston 18. With this arrangement, when the primary piston 18 is in a position where the port 69 is located in the bottom portion 12 side with respect to the seal ring 41, the seal ring 41 is capable of preventing communication between the primary hydraulic chamber 61 and the large diameter pressurizing chamber 70. Further, since the sealing ring 41 is a cup seal, it partitions the inside of the cylinder body 15 into the large diameter pressurizing chamber 70 on a side of the large diameter piston portion 66 and the primary hydraulic chamber 61 on a side of the small diameter piston portion 65, and also it permits a brake fluid to flow only from the large diameter pressurizing chamber 70 side to the primary hydraulic chamber 61 side when a pressure difference occurs therebetween.

The seal ring 48 fitted in the seal circumferential groove 46 is brought into slidable contact at its inner circumference with the outer circumference side of the large diameter piston portion 66 of the primary piston 18. With this arrangement, when the primary piston 18 is in a position where the communicating groove 68 and the annular groove 67 are located in the bottom portion 12 side with respect to the seal ring 48, the seal ring 48 is capable of preventing communication between the large diameter pressurizing chamber 70 and the communication hole 52 or the reservoir R. Further, since the seal ring 48 is a cup seal, it permits the brake fluid to flow only from the reservoir R side to the large diameter pressurizing chamber 70 side via the open groove 51 and the communication hole 52 when any pressure difference occurs between the large diameter pressurizing chamber 70 and the reservoir R.

The seal ring 49 fitted in the seal circumferential groove 47 on the opening portion 14 side is brought into slidable contact with the large diameter piston portion 66 of the primary piston 18, and thus it blocks off the communication between the communication hole 52 (or the reservoir R) and an open air via clearance between the inner circumference side of the cylinder body 15 and the outer circumference side of the primary piston 18.

An interval regulator 73 including a primary piston spring 72 is provided between the secondary piston 20 and the primary piston 18 so as to define an interval therebetween in a standby state with no input applied from a brake pedal side (not shown).

It is to be noted that the cylinder body 15 is formed with the bottom portion 12, the cylinder portion 13, and mounting-pedestals 25, 26, all of which are manufactured from an integrally molded material, for example, by processing an aluminum casting block.

In an initial state in which there is no input applied from a brake pedal (not shown)(hereinafter, positions of respective portions at this state are referred to as respective initial positions), the secondary piston 20 is located at its initial position, or at a far most position from the bottom portion 12 urged by a bias force of the secondary piston spring 62 of the interval regulator 63. At this time, the secondary piston 20 opens the port 59 to the open groove 33, and thus allows the secondary hydraulic chamber 60 to be in communication with the reservoir R via the communication hole 34.

When the secondary piston 20 is moved from the initial position toward the bottom portion 12 side by the input from the brake pedal, the port 59 of the secondary piston 20 is closed by the seal ring 30. As a result, communication between the secondary hydraulic chamber 50 and the reservoir R is prevented. Under this condition, when the secondary piston 20 is further moved toward the bottom portion 12, the brake fluid is supplied from the secondary hydraulic chamber 60 to the brake apparatus via the secondary discharge passage 53. It is to be noted that even if the port 59 is in the closed condition, when the hydraulic pressure in the secondary hydraulic chamber 60 becomes lower than the hydraulic pressure (atmospheric pressure) in the reservoir R, the seal ring 30 is adapted to open to thereby allow the brake fluid in the reservoir R to flow into the secondary hydraulic chamber 60.

Further, when the primary piston 18 is located at the initial position where it is in a position closest to the opening portion 14 urged by the bias force of the secondary piston spring 62 of the interval regulator 63 and the bias force of the primary piston spring 72 of the interval regulator 73, the port 69 communicating with the primary hydraulic chamber 61 is left in a open state so as to allow the primary hydraulic chamber 61 and the large diameter pressurizing chamber 70 to communicate with each other.

When the primary piston 18 is moved from the initial position toward the bottom portion 12 side by input from the brake pedal, the port 69 of the primary piston 18 is closed by the seal ring 41. As a result, communication between the primary hydraulic chamber 61 and the large diameter pressurizing chamber 70 via the port 69 is prevented. In this condition, when the primary piston 18 is further moved toward the bottom portion 12 side, the brake fluid is supplied from the primary hydraulic chamber 61 to the brake apparatus via the primary discharge passage 54. It is to be noted that even if the port 69 is in a closed condition, when the hydraulic pressure in the large diameter pressurizing chamber 70 becomes higher than the hydraulic pressure in the primary hydraulic chamber 61, the seal ring 41 is adapted to open to thereby allow the brake fluid in the large diameter pressurizing chamber 70 to flow into the primary hydraulic chamber 61.

Further, when the primary piston 18 is in the initial position, the large diameter pressurizing chamber 70 is in communication with the reservoir R via the communication groove 68, the annular groove 67, the open groove 51 and the communication hole 52. When the primary piston 18 is slidably moved from the initial position toward the bottom portion 12 side, the communication groove 68 and the annular groove 67 are closed by the seal ring 48, and communication between the large diameter pressurizing chamber 70 and the reservoir R is prevented. When the primary piston 18 is slidably moved further, the large diameter piston portion 66 reduces a volume of the large diameter pressurizing chamber 70 so as to increase the hydraulic pressure in the large diameter pressurizing chamber 70 to thereby open the seal ring 41 provided between the large diameter pressurizing chamber 70 and the primary hydraulic chamber 61, and then to supply the brake fluid from the large diameter pressurizing chamber 70 to the primary hydraulic chamber 61. By carrying out so-called fast fill for supplying a large volume of a brake fluid at an initial stage of operation when the brake fluid is supplied to the brake apparatus, an ineffective fluid amount at an initial stage of stroke is compensated for, and as a result, a pedal stroke can be shortened.

Figure 2:
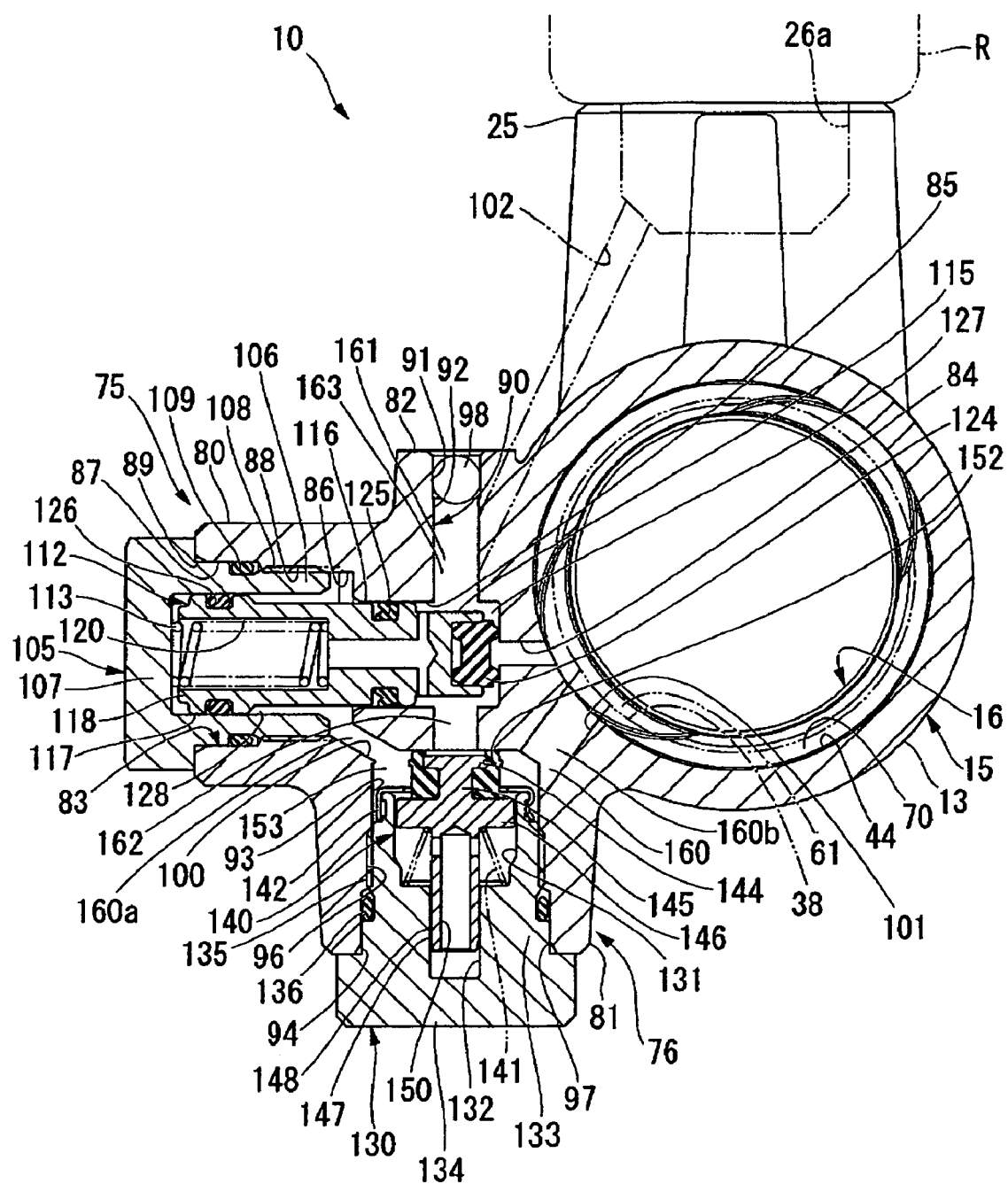
FIG. 2 is a sectional view of a main part showing a master cylinder according to the first embodiment of the present invention.

In the master cylinder 10 according to the first embodiment, the hydraulic pressure in the large diameter pressurizing chamber 70 is required to be gradually released in accordance with the progress of the fluid supply to the primary hydraulic chamber 61. Therefore, a control valve device 75 is provided so as to be incorporated in the cylinder body 15, as shown in FIG. 2. The control valve device 75 is connected to the large diameter pressurizing chamber 70, primary hydraulic chamber 61, and the reservoir R, and is adapted to release the hydraulic pressure in the large diameter pressurizing chamber 70 to the reservoir R side such that the hydraulic pressure in the large diameter pressurizing chamber 70 is gradually reduced in accordance with a rise in the hydraulic pressure in the primary hydraulic chamber 61.

Further, in the master cylinder 10 according to the first embodiment, a check valve device 76 is provided so as to be incorporated in the cylinder body 15. The check valve device 76 is configured to provide a bypass connection between the reservoir R and the primary hydraulic chamber 61 in order to accommodate a pump-up operation by a pump (not shown), in the VDC system so that the brake fluid is allowed to flow from the reservoir R side to the primary hydraulic chamber 61 side but is not allowed to flow from the primary hydraulic chamber 61 side to the reservoir R side.

Figure 3:
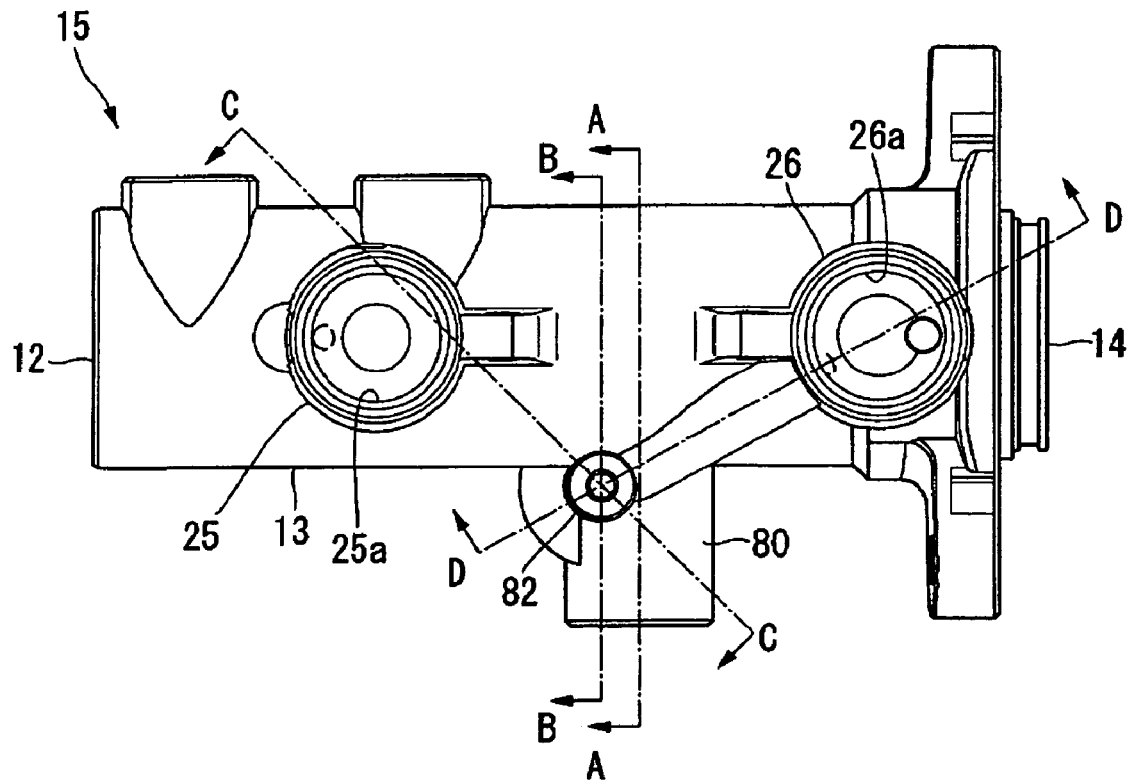
FIG. 3 is a plan view showing a master cylinder body according to the first embodiment of the present invention.
Figure 4:
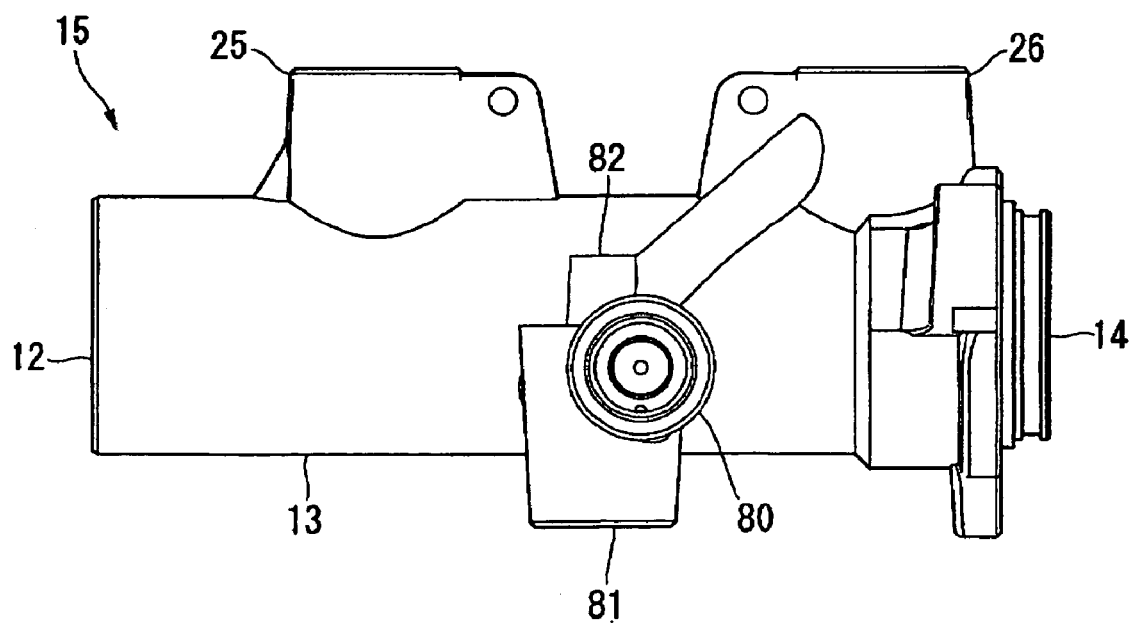
FIG. 4 is a front view of the cylinder body shown in FIG. 3.
Figure 5:
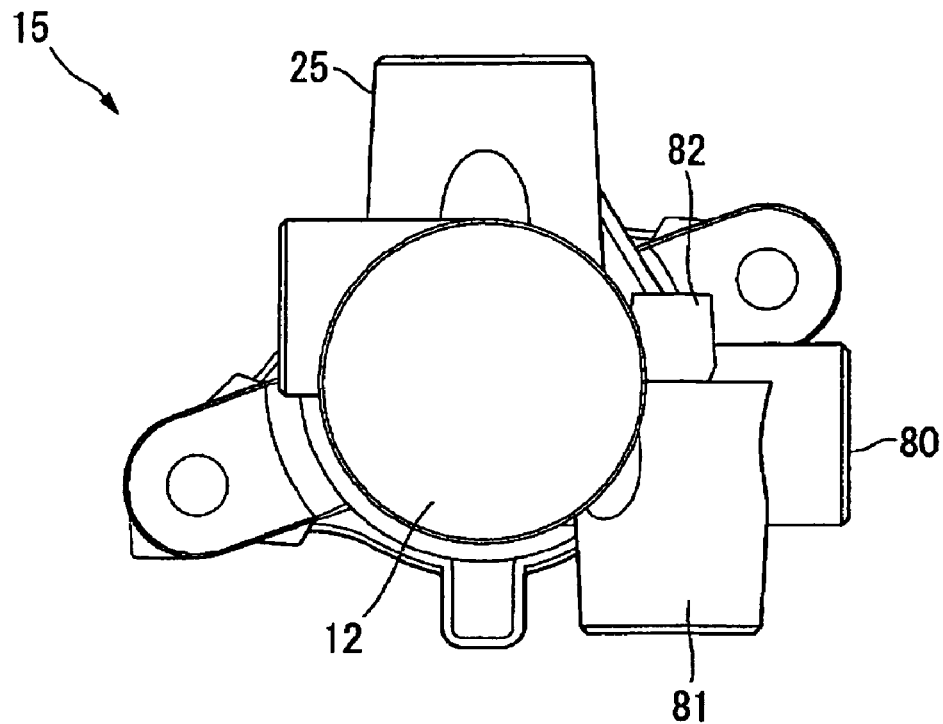
FIG. 5 is a side view of the cylinder body shown in FIG. 3.

As shown in FIG. 3 though FIG. 5, the cylinder body 15 is provided with a side protrusion portion 80, a downward protrusion portion 81, and an upward protrusion portion 82. The side protrusion portion 80 is formed to have a substantially cylindrical shape, and protrudes horizontally in the cylinder diameter direction at a mid position in the cylinder axis direction of the cylinder portion 13 (more specifically, at a position between the two mounting pedestals 25 and 26). The downward protrusion portion 81 is formed to be substantially cylindrical, and protrudes vertically downward from a proximal end of the side protrusion portion 80. The upward protrusion portion 82 is formed to protrude slightly in a vertical direction upward from the proximal end of the side protrusion portion 80. The side protrusion portion 80, downward protrusion portion 81, and upward protrusion portion 82 are also formed integrally with the bottom portion 12, the cylinder portion 13, and the mounting pedestals 25, 26 of the cylinder body 15 in a casting process.

Figure 6:
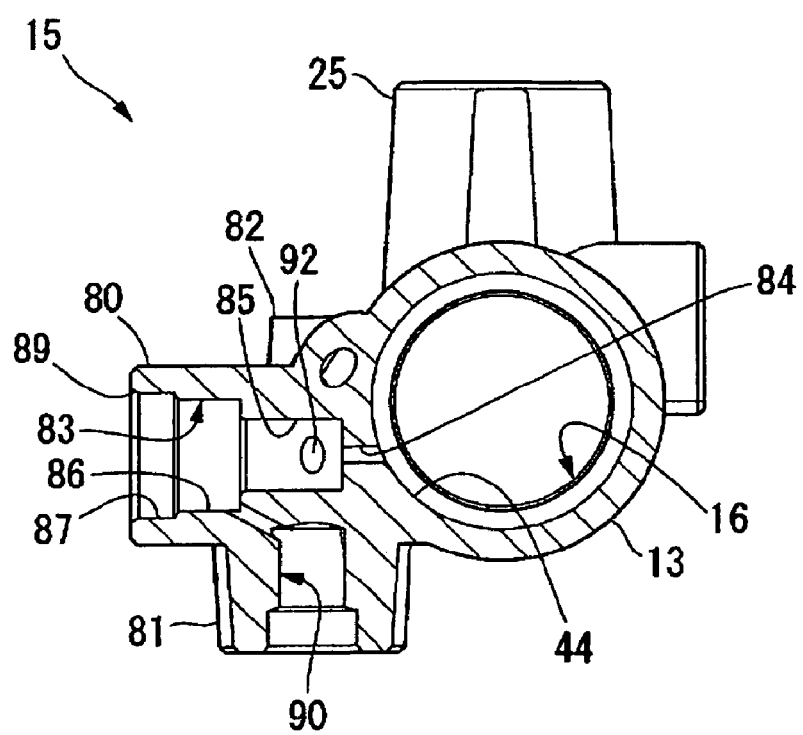
FIG. 6 is a sectional view taken along a line A-A of FIG. 3.

The side protrusion portion 80 constitutes a casing of the control valve device 75. A horizontal hole 83 is formed extending in the horizontal direction in a location of the side protrusion portion 80 in the cylinder body 15, as shown in FIG. 2 and FIG. 6. The horizontal hole 83 comprises a first hole portion 84 opening to the opening side large diameter bore portion 44 so as to communicate with the large diameter pressurizing chamber 70, a second hole portion 85 configured to be coaxial with the first hole portion 84 and to have a larger diameter as compared thereto, a third hole portion 86 configured to be coaxial with the second hole portion 85 and to have a larger diameter as compared thereto, and a fourth hole portion 87 configured to be coaxial with the third hole portion 86 and to have a larger diameter as compared thereto, each disposed in this order from the cylinder portion 13 side. An axis line of these holes is arranged to be in a horizontal direction and in parallel with the cylinder diameter direction. An internal thread portion 88 is formed on the third hole 86, and an open portion 89 is formed to open outward from a side of the fourth hole portion 87 that is remote or opposite from the third hole portion 86. Further, all holes of the horizontal hole 83 are formed by processing with a machining tool from the front side in the protruding direction of the side protrusion portion 80.

Figure 7:
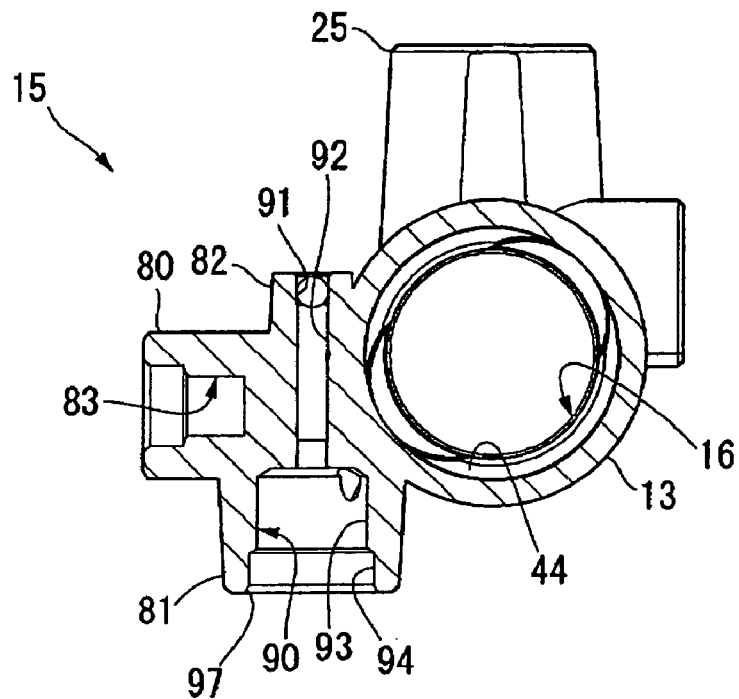
FIG. 7 is a sectional view taken along a line B-B of FIG. 3.

The downward protrusion portion 81 constitutes a casing of the check valve device 76. A vertical hole 90 is formed extending in the vertical direction in a location of the downward protrusion portion 81 and the upward protrusion portion 82 in the cylinder body 15, as shown in FIG. 2 and FIG. 7. The vertical hole 90 comprises a first hole portion 91 opening upward, a second hole portion 92 configured to be coaxial with the first hole portion 91 and to have a slightly smaller diameter as compared thereto, a third hole portion 93 configured to be coaxial with the second hole portion 92 and to have a larger diameter as compared thereto, and a fourth hole portion 94 configured to be coaxial with the third hole portion 93 and to have a larger diameter as compared thereto, each disposed in this order from the upper side, wherein an axis line of these holes is arranged to be vertical. An internal thread portion 96 is formed on the third hole 93, and an opening portion 97 is formed to open outward in a side of the fourth hole portion 94 remote or opposite from the third hole portion 93. Further, as to the processing of respective holes of the vertical hole 90, the first hole portion 91 and the second hole portion 92 are formed by processing with machining tool from the front side in the protruding direction of the upward protrusion portion 82 while the third hole portion 93, the fourth hole portion 94, and the internal thread portion 96 are formed by processing with machining tool from the front side in the protruding direction of the downward protrusion portion 81.

Herein, the second hole portion 85 of the horizontal hole 83 and the second hole portion 92 of the vertical hole 90 among the above-mentioned holes intersect each other when viewed in the cylinder axis direction; more specifically, they intersect each other orthogonally. Further, while center axes lines of the second hole portion 85 of the horizontal hole 83 and the second hole portion 92 of the vertical hole 90 are offset from each other in the cylinder axis direction, as shown in FIG. 6 and FIG. 7, the second hole portion 92 of the vertical hole 90 opens to the second hole portion 85 of the horizontal hole 83, as shown in FIG. 6.

Additionally, the cylinder body 15 is provided with a communication hole 100 connecting an end portion of the third hole portion 86 of the horizontal hole 83 defined in the second hole portion 85 side thereof and an end portion of the third hole portion 93 of the vertical hole 90 defined in the second hole portion 92 side thereof at proximal locations from each other, as shown in FIG. 2. An extension of the communication hole 100 is located within a space of the horizontal hole 83, and extends outward through a location in the opening portion 89. The communication hole 100 is processed by a machining tool inserted through the space within the horizontal hole 83.

Figure 8:
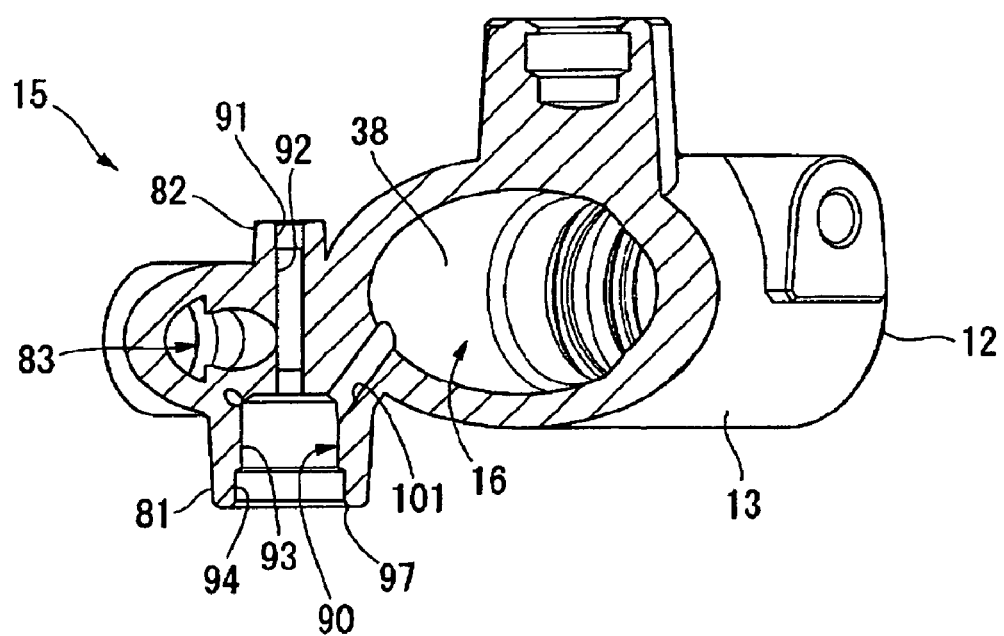
FIG. 8 is a sectional view taken along a line C-C of FIG. 3.

Further, the cylinder body 15 is provided with a communication hole 101 communicating with the primary hydraulic chamber 61 by connecting an end portion of the third hole portion 93 of the vertical hole 90 defined in the second hole portion 92 side thereof and the middle part large diameter bore portion 38, as shown in FIG. 2 and FIG. 8. An extension of the communication hole 101 is located within a space of the vertical hole 90, and extends outward through a location in the opening portion 97. The communication hole 101 is processed by a machining tool inserted through the space within the vertical hole 90.

Figure 9:
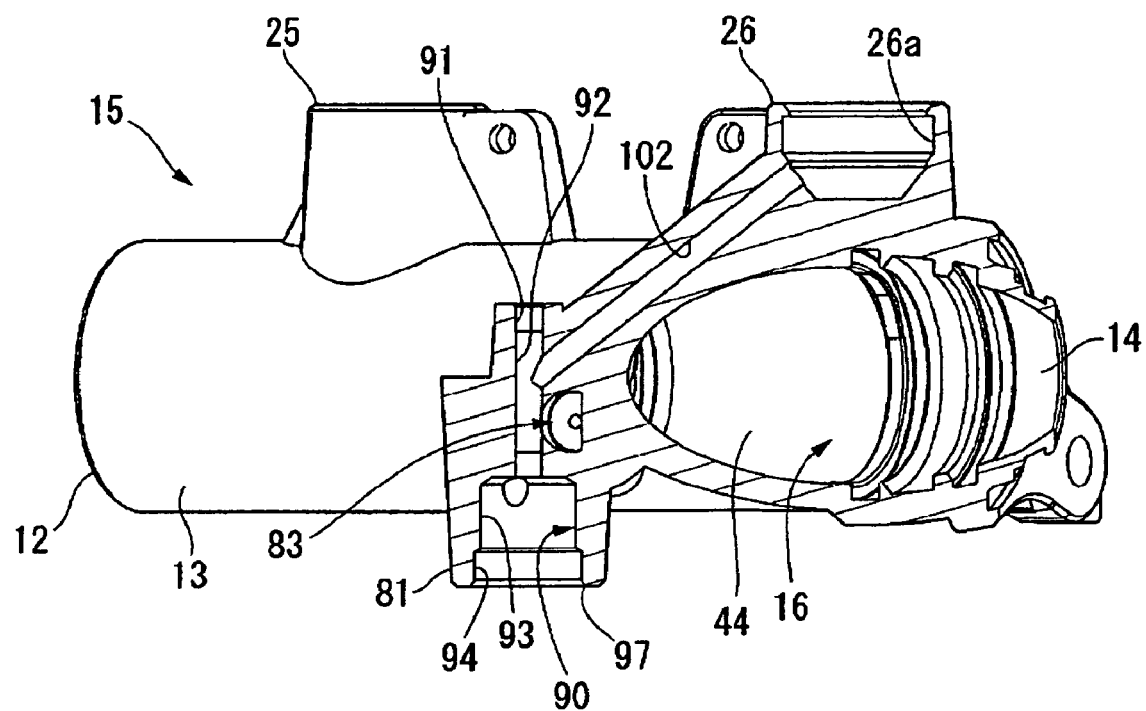
FIG. 9 is a sectional view taken along a line D-D of FIG. 3.

In addition, the cylinder body 15 is provided with a communication hole 102. One end of the communication hole 102 opens to the second hole portion 92 of the vertical hole 90. In particular, the one end of the communication hole 102 opens to the second hole portion 92 at a mid portion thereof between the intersection point with the horizontal hole 83 and an end position of the second hole portion 92 defined in the first hole portion 91 side, as shown in FIG. 9. The other end of the communication hole 102 opens into the mounting hole 26a defined in the opening portion 14 side of the cylinder body 15, and accordingly communicates with the reservoir R via the mounting hole 26a. An extension of the communication hole 101 is located within a space of the mounting hole 26a. The communication hole 102 is processed by a machining tool inserted through the space within the mounting hole 26a. It is to be noted that the first hole portion 91 of the vertical hole 90 is closed by hammering a spherical closing member 98 thereinto, as shown in FIG. 2.

The above-mentioned horizontal hole 83 is closed by a cap body 105, which serves as a casing of the control valve device 75, as shown in FIG. 2. The cap body 105 is formed of a shape of substantially bottomed cylinder having a cylinder portion 106 and a bottom portion 107 closing one end of the cylinder portion 106 defined in its axial direction. An external thread 108 is formed on the cylinder portion 106 along its side remote or opposite from the bottom portion 107. The external thread 108 is threadingly engaged with the internal thread 88 of the horizontal hole 83. A sealing member 109 is provided on the outer side of the threadingly engaged location of the external thread 108 and the internal thread 88 so as to seal any clearance between the horizontal hole 83 and the cap body 105.

Further, the control valve device 75 comprises a control valve body 112 capable of moving horizontally and a valve spring 113 biasing the control valve body 112 against the cylinder portion 13 side of the cylinder body 15, wherein the control valve body 112 and the spring 113 is arranged in a space defined by the horizontal hole 83 and the cap body 105.

The control valve body 112 comprises a piston member 118. The piston member 118 comprises a first shaft portion 115, a second shaft portion 116 configured to be coaxial with the first shaft portion 115 and to have a larger diameter as compared thereto, and the third shaft portion 117 configured to be coaxial with the second shaft portion 116 and to have a larger diameter as compared thereto, each arranged in this order from the first hole portion 84 side. The piston member 118 is provided with an internal passage 120. One end of the internal passage 120 opens to an end portion of the third shaft portion 117 defined in its axial line direction. The other end of the internal passage 120 opens to a surface of an outer diameter of the first shaft portion 115. The second shaft portion 116 is slidably fitted into the second hole portion 85, and the third shaft portion 117 is slidably fitted into an inner circumferential surface of the cylinder portion 106 of the cap body 105, so that the piston member 118 is capable of moving horizontally.

Further, the control valve body 112 has a seal member 124 which is fitted into an end of the first shaft portion 115 of the piston member 118 so as to be capable of closing the first hole portion 84 by contacting with a bottom face of the second hole portion 85 of the horizontal hole 83; a seal ring 125 which is fitted over the second shaft portion 116 so as to constantly seal a clearance with the horizontal hole 83; and a seal ring 126 which is fitted over the third shaft portion 117 so as to constantly seal a clearance with the cap body 105.

The valve spring 113 is inserted into the internal passage 120 of the piston member 118 so as to come in contact with a step surface in the internal passage 120 and a bottom surface of the cap body 105 to thereby bias the control valve body 112 in a direction to close the first hole portion 84 with the seal member 124.

In the control valve device 75, a control valve chamber 127 is defined mainly by an inner portion of the second hole portion 85 of the horizontal hole 83. The control valve body 112 is accommodated in the control valve chamber 127. Additionally, a control pressure chamber 128 is defined mainly by a space surrounded by the second shaft portion 116, the cap body 105, and the third hole portion 86 of the horizontal hole 83.

The above-mentioned vertical hole 90 is closed by a cap body 130 constituting a casing of the check valve device 76. The cap body 130 is formed to have a shape of a substantially bottomed cylinder having a cylinder portion 133, an inside of which consists of a large diameter inner circumference portion 131 and a small diameter inner circumference portion 132 having a smaller diameter than that of the large diameter inner circumference portion 131 to thereby form a stepped shape; and a bottom portion 134 closing the cylinder portion 133 at the small diameter inner circumference portion 132 side. An external thread 135 is formed on the cylinder portion 133 along its side remote or opposite from the bottom portion 134, and the external thread 135 is threadingly engaged with the internal thread 96 of the vertical hole 90. A seal ring 136 is provided on the outer side of the threadingly engaged location of the external thread 135 and the internal thread 96 so as to seal any clearance between the vertical hole 90 and the cap body 130.

The check valve device 76 comprises a check valve body 140 capable of moving vertically, a valve spring 141 for biasing the check valve body 140 upward, and a locking retainer 142 for securely holding the check valve body 140. The check valve body 140, the valve spring 141, and the locking retainer 142 are arranged in a space defined by the vertical hole 90 and the cap body 130.

The check valve body 140 comprises a piston member 148. The piston member 148 has a flange portion 144, a first shaft portion 145, a second shaft portion 146 configured to be coaxial with the first shaft portion 145 and to have a larger diameter as compared thereto, and a third shaft portion 147 configured to be coaxial with the second shaft portion 146 and to have a smaller diameter as compared thereto, each arranged in this order from the top side in the drawing. An internal passage 150 is formed in the piston member 148. One end of the internal passage 150 opens to an end portion of the third shaft portion 147 in its axis line direction. The other end of the internal passage 150 opens to an outer diameter surface of the third shaft portion 147 on its second shaft portion 146 side. The third shaft portion 147 is slidably fitted into the small diameter inner circumference portion 132 of the cap body 130, and the second shaft portion 146 is slidably fitted into the large diameter inner circumference portion 131, so that the piston member 148 is capable of moving vertically.

Further, the check valve body 140 has a seal member 152. The seal member 152 is fitted over a flange portion 144 of the piston member 148 and the first shaft portion 145, and is adapted to come in contact with the bottom surface of the third hole portion 93 of the vertical hole 90 so as to close the second hole portion 92.

The third shaft portion 147 of the piston member 148 is inserted into an inside of the valve spring 141. The valve spring 141 comes in contact with an end surface of the second shaft portion 146 and a step surface of the cap body 130, and thus biases the check valve body 140 in a direction to close the second hole portion 92 by the seal member 152.

The locking retainer 142 is engaged with an opening side of the cylinder portion 133 of the cap body 130 for the purpose of preventing the check valve body 140 from being detached from the cap body 130. This is intended to fabricate a small assembly in which the check valve body 140 and the valve spring 141 are previously installed into the cap body 130 and the locking retainer 142 is attached to prevent them from being detached. The small assembly is mounted on the cylinder body 15 together with the seal ring 136.

In the above-mentioned check valve device 76, the check valve chamber 153 is mainly defined by an inside portion of the third hole portion 93 of the vertical hole 90. The check valve chamber 153 is configured such that the opening portion 97 opening downward in the vertical direction is closed by the cap body 130. Herein, the check valve body 140 is accommodated in the check valve chamber 153. Further, the check valve chamber 153 is located in the lower side vertically from the control valve device 75.

The control pressure chamber 128 of the above-mentioned control valve device 75 communicates with the primary hydraulic chamber 61 via the communication hole 100, the check valve chamber 153 of the check valve device 76 and the communication hole 101. The communication hole 100 and the communication hole 101 form a small diameter hydraulic passage 160, and connect the primary hydraulic chamber 61 and the control pressure chamber 128 of the control valve device 75 via the check valve chamber 153. In other words, the check valve chamber 153 communicates with the small diameter hydraulic passage 160 connecting the primary hydraulic chamber 61 and the control valve device 75. In the small diameter hydraulic passage 160, one part which is formed with the communication hole 100 is referred to as a straight passage 160a, and the other part which is formed with the communication hole 101 is referred to as a straight passage 160b.

In a condition where the control valve body 112 of the control valve device 75 is disengaged from the bottom surface of the second hole portion 85 of the horizontal hole 83, the large diameter pressurizing chamber 70 communicates with the reservoir R via the first hole portion 84 of the horizontal hole 83, the control valve chamber 127, a part of the second hole portion 92 of the vertical hole 90 defined in the first hole portion 91 side with respect to the control valve chamber 127, and the communication hole 102. The first hole portion 84 of the horizontal hole 83, the part of the second hole portion 92 of the vertical hole 90 defined in the first hole portion 91 side with respect to the control valve chamber 127, and the communication hole 102 provide a communication passage between the large diameter pressurizing chamber 70 and the reservoir R via the control valve chamber 127, to thereby form the relief passage 161 to release the hydraulic pressure in the large diameter pressurizing chamber 70 to the reservoir R via the control valve device 75. A part of the relief passage 161, which comprises the second hole portion 92 of the vertical hole 90, extends along the vertical direction.

Further, a part of the second hole portion 92 of the vertical hole 90 defined in the third hole portion 93 side with respect to the control valve chamber 127 forms a communication passage 162. The communication passage 162 constantly communicates with the relief passage 161 via the control valve chamber 127 so as to allow communication between the relief passage 161 and the check valve chamber 153. The communication passage 162, which comprises the second hole portion 92 of the vertical hole 90, and a part of the relief passage 161 form a straight passage 163 passing through the control valve chamber 127 and the check valve chamber 153.

Thus, the check valve chamber 153 of the check valve device 76 communicates with the relief passage 161, and eventually with the reservoir R, via the communication passage 162, and also communicates with the primary hydraulic chamber 61 via the straight passage 160b of the small diameter hydraulic passage 160. In other words, the small diameter hydraulic passage 160 connecting the primary hydraulic chamber 61 and the control pressure chamber 128 of the control valve device 75 communicate with the check valve chamber 153. Also, the straight passage 160a and the straight passage 160b communicate with each other via the check valve chamber 153. Additionally, the check valve body 140 accommodated in the check valve chamber 153 permits a flow of a brake fluid from the reservoir R to the small diameter hydraulic passage 160 side via the relief passage 161, the control valve chamber 127, the communication passage 162 and the check valve chamber 153. That is to say, the check valve body 140 permits flow of the brake fluid from the reservoir R to the primary hydraulic chamber 61 via the small diameter hydraulic passage 160. On the other hand, the check valve body 140 prevents flow of the brake fluid in an inverse direction. That is to say, the check valve body 140 prevents flow of the brake fluid from the primary hydraulic chamber 61 to the reservoir R via the small diameter hydraulic passage 160, the check valve chamber 153, the communication passage 162, the control valve chamber 127 and the relief passage 161.

As a result, when pumping up a brake fluid of the primary hydraulic chamber 61 by a pump of the VDC system (not shown), the suction pressure causes the check valve body 140 to be moved against the bias force of the valve spring 141 so as to open the check valve device 76, and thus allow a large amount of bake fluid to flow from the reservoir R to the primary hydraulic chamber 61 via the relief passage 161, the control valve chamber 127, the communication passage 162, the reverse valve chamber 153, and the straight passage 160b of the small diameter hydraulic chamber 160. More specifically, such a flow volume is larger than that of a brake fluid flow from the reservoir R to the primary hydraulic chamber 61 via the large diameter pressurizing chamber 70.

The control pressure chamber 128 of the control valve device 75 constantly communicates with the primary hydraulic chamber 61 via the small diameter hydraulic passage 160 and the check valve chamber 153 of the check valve device 76. As a result, a thrust force acting against the bias force of the valve spring 113, that is to say a thrust force in a valve opening direction, is generated and applied to the control valve body 112 by the hydraulic pressure in the primary hydraulic chamber 61 and a difference in pressure receiving area between the seal rings 125 and 126. When the control valve body 112 is moved by this thrust force acting against the bias force of the valve spring 113, the relief passage 161 is opened, and the hydraulic pressure in the large diameter pressurizing chamber 70, which is communicated therewith via a part of the first hole portion 84 of the relief passage 161, is released to the reservoir R side via the control valve chamber 127 and the other parts of the relief passage 161. Herein, the thrust force applied to the control valve body 112 changes in response to the hydraulic pressure in the primary hydraulic chamber 61 to be introduced into the control pressure chamber 128, and consequently, the control valve body 112 releases the hydraulic pressure in the large diameter pressurizing chamber 70 to the reservoir R side such that the hydraulic pressure in the large diameter pressurizing chamber 70 is gradually reduced in accordance with a rise in the hydraulic pressure in the primary hydraulic chamber 61.

To sum up, when carrying out the above-mentioned fast fill, brake oil is fed from the large diameter pressurizing chamber 70 into the primary hydraulic chamber 61 by pushingly opening the seal ring 41, and an ineffective fluid amount (mainly amount of caliper rollback) at an initial stage of stroke is compensated for. Thereafter, the hydraulic pressure in the large diameter pressurizing chamber 70 and the hydraulic pressure in the primary hydraulic chamber 61 are held at the same pressure and increased up to the pressurizing chamber relief hydraulic pressure while delivering brake fluid from the large diameter pressurizing chamber 70 to the primary hydraulic chamber 61 in order to compensate for an insufficient fluid amount caused by a reduction in diameter of the primary hydraulic chamber 61. Further, when the hydraulic pressure rises to the pressurizing chamber relief hydraulic pressure, the control valve device 75, which is in a closed state up to that time, releases hydraulic pressure in the large diameter pressurizing chamber 70. At that time, as described above, the control valve device 75 releases hydraulic pressure in the large diameter pressurizing chamber 70 such that the hydraulic pressure in the large diameter pressurizing chamber 70 gradually lowers in accordance with the rise in the hydraulic pressure in the primary hydraulic chamber 61.

Since the horizontal hole 83 and the vertical hole 90 intersect each other (specifically, intersect orthogonally), as described above, when viewed from the cylinder axis direction, the moving direction of the control valve body 112, which is slidably guided with the horizontal hole 83 and the cap body 105 threadably engaged therewith; and the moving direction of the check valve body 140, which is slidably guided with the cap body 130 threadably engaged with the vertical hole 90, intersect each other (specifically, intersect orthogonally) when viewed from the cylinder axis direction. Furthermore, the horizontal hole 83 is arranged horizontally and the vertical hole 90 is arranged vertically, so that the moving direction of the control valve body 112 of the control valve device 75 is in the horizontal direction, and the moving direction of the check valve body 140 of the check valve device 76 is in the vertical direction.

Additionally, an extension of the communication hole 101 communicating with the check valve chamber 153 and the primary hydraulic chamber 61 is within a space of the vertical hole 90, and extends outward through the location in its opening portion 97, as described above. Therefore, an extension of the straight passage 160b which is a part of the small diameter hydraulic passage 160 and is formed of the communication hole 101 is also located within the space of the opening portion 97.

Moreover, as described above, an extension of the communication hole 100 communicating with the check valve chamber 153 and the control pressure chamber 128 is in a space of the horizontal hole 83, and extends outward through the opening portion 89. Therefore, an extension of the straight passage 160a which is the other part of the small diameter hydraulic passage 160 and is formed of the communication hole 100 is also located in a space of the opening portion 89. It is to be noted that the extension of the straight passage 160a may be located in a space of the opening portion 97.

In the master cylinder 10 according to the above-mentioned first embodiment, the check valve chamber 153 of the check valve device 76, which is required to communicate with the reservoir R and the primary hydraulic chamber 61, is configured to communicate with the relief passage 161 for releasing the hydraulic pressure in the large diameter pressurizing chamber 70 to the reservoir R via the control valve device 75, and with the primary hydraulic chamber 61, respectively. Therefore, the check valve chamber 153 and the reservoir R can be connected, not with an exclusive passage, but with the relief passage 161 which releases the hydraulic pressure in the large diameter pressurizing chamber 70 to the reservoir R via the control valve device 75. That is to say, the relief passage 161 can be shared between the control valve device 75 and the check valve device 76. Therefore, simplification of the passage constitution is actualized so that productivity can be increased by controlling a number of manufacturing processes.

Since the moving direction of the control valve body 112 of the control valve device 75 and the moving direction of the check valve body 140 of the check valve device 76 intersect when viewed from the cylinder axis direction, the control valve device 75 and the check valve device 76 can be provided in a compact arrangement.

Further, since the small diameter hydraulic passage 160 which connects the primary hydraulic chamber 61 and the control valve device 75 communicates with the check valve chamber 153, the check valve chamber 153 can be utilized as a part of the small diameter hydraulic passage 160. Therefore, simplification of the passage constitution can be actualized so that productivity can be increased by controlling a number of manufacturing processes.

Further, the moving direction of the control valve body 112 of the control valve device 75 is horizontal, and the moving direction of the check valve body 140 of the check valve device 76 is vertical, the control valve device 75 and check valve device 76 can be provided in a compact arrangement.

Further, since the check valve chamber 153 of the check valve device 76 is provided in the lower side vertically from the control valve device 75, the control valve device 75 and the check valve device 76 can be provided in a compact arrangement.

Further, since a part of the relief passage 161 is provided along the vertical direction, the air in the check valve device 76 can be effectively bled when the master cylinder 1 is filled with the brake fluid.

Further, since the downward protrusion portion 81 serving as a casing of the check valve device 76 and the side protrusion portion 80 serving as a casing of the control valve device 75 are formed integrally with the cylinder body 15, a number of components can be reduced, and simplification of the passage constitution can be actualized, thereby resulting in a reduction in costs.

Further, since the communication passage 162 providing communication between the relief passage 161 and the check valve chamber 153 is connected with the relief passage 161 via the control valve chamber 127 of the control valve device 75, which is connected with the relief passage 161, the control valve chamber 127 can be shared as a part of the communication passage 162. Therefore, a further simplification of the passage constitution can be actualized so that productivity can be further improved by further controlling an increase in a number of manufacturing processes.

Further, since a part of the communication passage 162 and the relief passage 161 is the straight passage 163 through the control valve chamber 127 and the check valve chamber 153, these can be formed using a single boring process. Accordingly, an increase in a number of manufacturing processes can be controlled to thereby improve productivity.

Further, since a part of the small diameter hydraulic passage 160, which is formed by the communication hole 101, is the straight passage 160*b* connecting the check valve chamber 153 and the primary hydraulic chamber 61, and the extension of the straight passage 160*b* is located within a space of the opening portion 97 of the vertical hole 90 constituting the check valve chamber 153, the straight passage 160*b* can be processed via the opening portion 97.

Further, since the check valve chamber 153, which is required to communicate with the reservoir R and the primary hydraulic chamber 61, is configured to respectively communicate with the reservoir R and the small diameter hydraulic passage 160 which connects the control valve device 75 with the primary hydraulic chamber 61, which control valve device 75 releases the hydraulic pressure in the large diameter pressurizing chamber 70 to the reservoir R side such that the hydraulic pressure in the large diameter pressurizing chamber 70 is reduced in accordance with a rise in the hydraulic pressure in the primary hydraulic chamber 61. Therefore, the check valve chamber 153 and the primary hydraulic chamber 61 can be connected, not with an exclusive passage, but with the straight passage 160*b* of the small diameter hydraulic passage 160 which connects the control valve device 75 to the primary hydraulic chamber 61. That is to say, the straight passage 160*b* of the small diameter hydraulic passage 160 can be shared between the control valve device 75 and the check valve device 76. Accordingly, simplification of the passage constitution can be actualized so that productivity can be improved by controlling an increase in a number of manufacturing processes.

Further, the control valve device 75 has the control pressure chamber 128, which is connected to the small diameter hydraulic passage 160 and applies a pressure to the control valve body 112 in the direction in which the valve body 112 is opened, and the straight passage 160*a* and the straight passage 160*b* of the small diameter hydraulic passage 160 connecting the control pressure chamber 128 and the primary hydraulic chamber 61 communicate with each other via the check valve chamber 153. Accordingly, the check valve chamber 153 can be utilized as a part of the small diameter hydraulic passage 160. Therefore, further simplification of the passage constitution can be actualized so that productivity can be further increased by further controlling an increase in a number of manufacturing processes.

Further, since the straight passage 160*a* through the control pressure chamber 128 and the check valve chamber 153 is a part of the small diameter hydraulic passage 160, the control pressure chamber 128 and the check valve chamber 153 can be formed with one boring process. Therefore, productivity can be further improved by further controlling an increase in a number of manufacturing processes.

Figure 10:
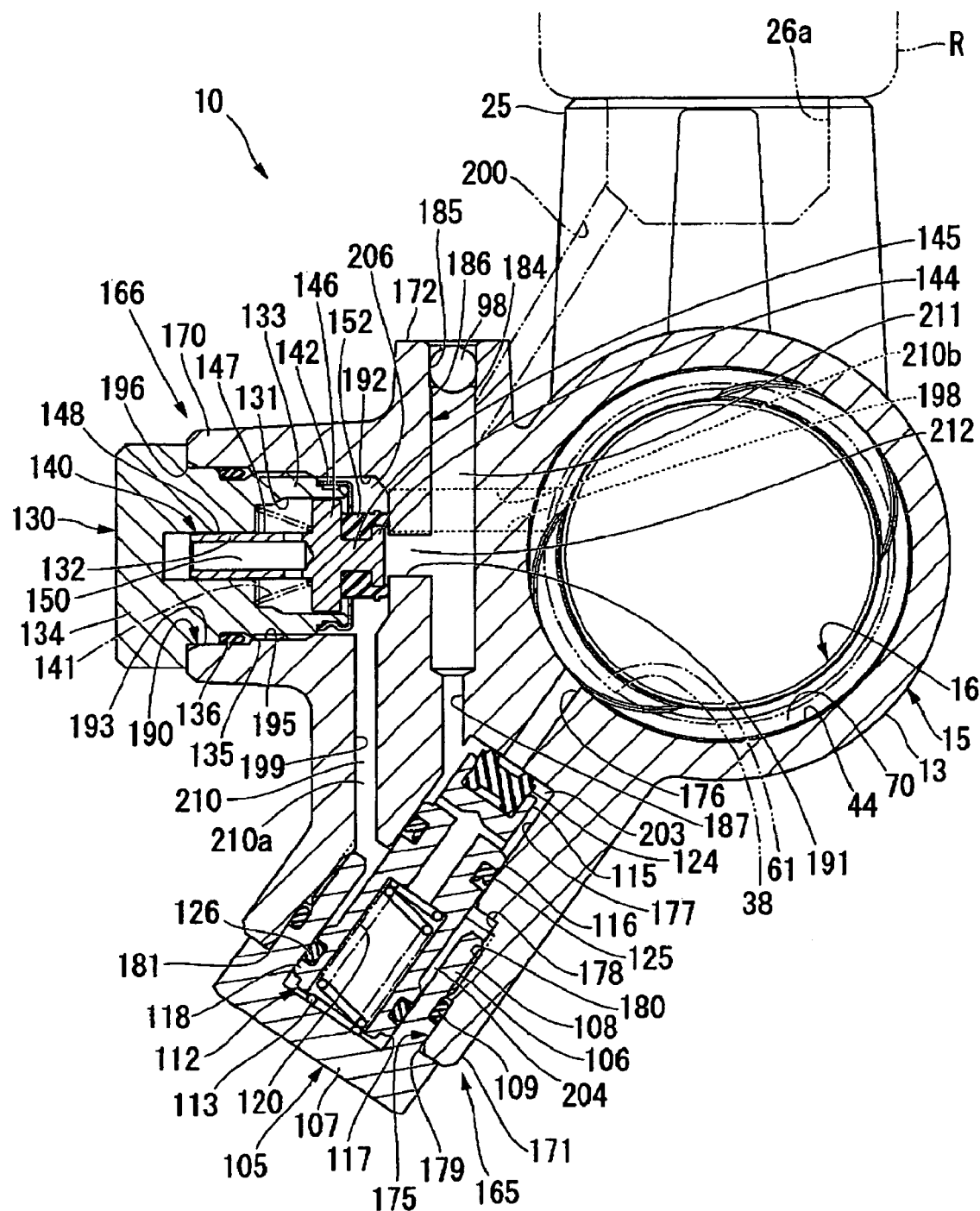
FIG. 10 is a sectional view of a main part showing a master cylinder according to a second embodiment of the present invention.

An explanation of a master cylinder according to a second embodiment of the present invention will be given as follows, mainly with reference to FIG. 10 focusing on a portion thereof different from the first embodiment. Further, portions similar to those of the first embodiment are designated by the same reference numerals and explanation thereof will be omitted.

The second embodiment differs from the first embodiment mainly in an arrangement of the control valve device 165 and the check valve device 166. The control valve device 165 is connected to the large diameter pressurizing chamber 70, the primary hydraulic chamber 61, and the reservoir R, and is adapted to release the hydraulic pressure in the large diameter pressurizing chamber 70 to the reservoir R side such that the hydraulic pressure in the large diameter pressurizing chamber 70 is reduced gradually in accordance with a rise in the hydraulic pressure in the primary hydraulic chamber 61. The check valve device 166 permits flow of the brake fluid from the reservoir R side to the primary hydraulic chamber 61 side, and prevents flow of the brake fluid from the primary hydraulic chamber 61 side to the reservoir R side.

That is to say, according to the second embodiment, the cylinder body 15 is provided with a side protrusion portion 170, a slanted protrusion portion 171, and an upward protrusion portion 172. The side protrusion portion 170 protrudes in a stepped cylinder shape laterally and horizontally in the cylinder diameter direction at a mid position in the cylinder axis direction of the cylinder portion 13. The slanted protrusion portion 171 protrudes obliquely downward from the proximal end of the side protrusion portion 170. The upward protrusion portion 172 protrudes slightly in a vertical direction upward from the proximal end of the side protrusion portion 170. The side protrusion portion 170, the slanted protrusion portion 171, and the upward protrusion portion 172 are also formed integrally with the bottom portion 12, cylinder portion 13, and the mounting pedestals 25, 26 when casting the cylinder body 15.

The slanted protrusion portion 171 constitutes a casing of the control valve device 165. An inclined hole 175 is formed extending in the slant direction of the slanted protrusion portion 171 at a location of the slanted protrusion portion 171 in the cylinder body 15. The inclined hole 175 comprises a first hole portion 176 opening to the large diameter bore portion 44 to thereby communicate with the large diameter pressurizing chamber 70, a second hole portion 177 configured to be coaxial with the first hole portion 176 and to have a larger diameter as compared thereto, a third hole portion 178 configured to be coaxial with the second hole portion 177 and to have a larger diameter as compared thereto, and a fourth hole portion 179 configured to be coaxial with the third hole portion 178 and to have a larger diameter as compared thereto, each arranged in this order from the cylinder portion 13 side. An axis line of these holes is arranged to be parallel to the cylinder diameter direction. An internal thread portion 180 is formed in the third hole 178. An open portion 181 opening outward is formed in the end of the fourth hole portion 179 remote or opposite from the third hole portion 178. Further, all holes of the inclined hole 175 are formed by processing with a machining tool from the front side in the protruding direction of the slanted protrusion portion 171.

A vertical hole 184 is formed at a location for the upward protrusion portion 172 in the cylinder body 15. The vertical hole 184 comprises a first hole portion 185 opening upward, a second hole portion 186 configured to be coaxial with the first hole portion 185 and to have a slightly smaller diameter as compared thereto, and a third hole portion 187 configured to be coaxial with the second hole portion 186 and to have a smaller diameter as compared thereto. An axis line of these holes is arranged to be vertical. In the vertical hole 184, the third hole portion 187 opens to an inner circumferential surface of the second hole portion 177 of the inclined hole 175. Any holes constituting the vertical hole 184 may be formed by processing with a machining tool from the front side in the protruding direction of the upward protrusion portion 172.

The side protrusion portion 170 constitutes a casing of the check valve device 166. A horizontal hole 190 is formed extending along the horizontal direction in a location for the side protrusion portion 170 in the cylinder body 15. The horizontal hole 190 comprises a first hole portion 191 opening to the second hole portion 186 of the vertical hole 184, a second hole portion 192 configured to be coaxial with the first hole portion 191 and to have a larger diameter as compared thereto, and a third hole portion 193 configured to be coaxial with the second hole portion 192 and to have a larger diameter as compared thereto, each arranged in this order from the cylinder portion 13 side. An axis line of these holes is arranged to be in a horizontal direction parallel to the cylinder diameter direction. An internal thread portion 195 is formed in the second hole 192. Further, an open portion 196 opening outward is formed in the end of the third hole portion 193 remote or opposite from the second hole portion 192. Further, a communication hole 198 is formed in a bottom surface of the second hole portion 192 extending parallel to the first hole portion 191 and opening to the middle part large diameter bore portion 38 to thereby communicate with the primary hydraulic chamber 61. It is to be noted that all holes of the horizontal hole 190 and the communication hole 198 may be formed by processing with a machining tool from the front side in the protruding direction of the side protrusion portion 170.

Herein, the above-mentioned inclined hole 175 and the horizontal hole 190 are arranged such that respective axis lines intersect with each other when viewed from the cylinder axis direction.

A communication hole 199 is formed so as to connect an end portion of the third hole portion 178 of the inclined hole 175 defined in the second hole portion 177 side and an end portion of the second hole portion 192 of the horizontal hole 190 defined in the first hole portion 191 side at proximal locations with each other. The axis of the communication hole 199 is arranged vertically, and the extension thereof is in a space of the inclined hole 175 and extends outward through a location in the opening portion 181. The communication hole 199 is formed by processing with a machining tool that is inserted through a space of the inclined hole 175.

Additionally, the second hole portion 186 of the vertical hole 184 has a mid portion between a location of an intersection with the horizontal hole 190 and an end portion defined in the first hole portion 185 side with respect to the location of the intersection. A communication hole 200 is formed in the mid portion of the second hole portion 186. The communication hole 200 opens to the mounting hole 26a of the cylinder body 15 defined in the opening portion 14 side to thereby communicate with the reservoir R. An extension of the communication hole 200 is in a space of the mounting hole 26a defined in the opening portion 14 side. The communication hole 200 is formed by processing with a machining tool that is inserted through a space of the mounting hole 26a. It is to be noted that the first hole portion 185 of the vertical hole 184 is closed by hammering a spherical closing member 98 thereinto in the same manner as in the first embodiment.

The above-mentioned inclined hole 175 is closed by the cap body 105, which constitutes a casing of the control valve device 165 similar to the first embodiment, and the seal ring 109. The cap body 105 is configured to threadingly engage the external thread 108 with the internal thread 180 of the inclined hole 175. The control valve device 165 comprises a control valve body 112 similar to the first embodiment capable of moving along the axis direction of the inclined hole 175, and a valve spring 113 similar to the first embodiment for biasing the control valve body 112 toward the cylinder portion 13 side of the cylinder body 15, or toward a closing direction, each arranged in a space defined by the inclined hole 175 and the cap body 105.

As for the piston member 118 of the control valve body 112, the second shaft portion 116 is slidably fitted in the second hole portion 177 of the inclined hole 175, and the third shaft portion 117 is slidably fitted to the inner circumferential surface of the cylinder portion 106 of the cap body 105. Further, the control valve body 112 is adapted to close the first hole portion 176 by bringing the seal member 124 into contact with the bottom surface of the second hole portion 177 of the inclined hole 175. Further, the control valve body 112 is provided with the seal rings 125, 126 so as to constantly seal any clearances with the inclined hole 175 and with the cap body 105.

In the control valve device 165, a control valve chamber 203 is defined mainly by an inner portion of the second hole portion 177 of the inclined hole 175, and the control valve body 112 is accommodated in the control valve chamber 203. Additionally, a control pressure chamber 204 is defined mainly by a space surrounded by the second shaft portion 116, the cap body 105, and the third hole portion 178 of the inclined hole 175.

The above-mentioned horizontal hole 190 are closed by the cap body 130, which constitutes a casing of the check valve device 166 similar to the first embodiment, and the seal ring 136. The cap body 130 is configured to threadingly engage the external thread 135 with the internal thread 195 of the horizontal hole 190. The check valve device 166 comprises a check valve body 140 similar to the first embodiment capable of moving horizontally, a valve spring 141 similar to the first embodiment for biasing the check valve body 140 toward the cylinder portion 13 side of the cylinder body 15, or toward a closing direction, and the locking retainer 142 similar to the first embodiment for securely holding the check valve body 140, each arranged in a space defined by the horizontal hole 190 and the cap body 130.

The seal member 152 of the check valve body 140 is adapted to come into contact with the bottom surface of the second hole portion 192 of the horizontal hole 190 to thereby block the first hole portion 191. It is to be noted that the seal member 152 does not block the communication hole 198 when coming into contact with the bottom surface of the second hole portion 192.

In the above-mentioned check valve device 166, a check valve chamber 206 is defined mainly by an inner portion of the second hole portion 192 of the horizontal hole 190. The check valve chamber 206 is configured such that an opening portion 196 opening laterally in the horizontal direction is closed by the cap body 130 similar to the first embodiment and the seal ring 136. Further, the check valve body 140 similar to the first embodiment is accommodated in the check valve chamber 206. Also, the check valve chamber 206 is provided in the upper side vertically from the control valve device 165.

The above-mentioned control pressure chamber 204 of the control valve device 165 communicates with the primary hydraulic chamber 61 via the communication hole 199, the check valve chamber 206 of the check valve device 166, and the communication hole 198. The communication holes 198, 199 form the small diameter hydraulic passage 210, and the small diameter hydraulic passage 210 connects the primary hydraulic chamber 61 and the control pressure chamber 204 of the control valve device 165 via the check valve chamber 206. In other words, the check valve chamber 206 communicates with the small diameter hydraulic passage 210 which connects the primary hydraulic chamber 61 and the control valve device 165. In the small diameter hydraulic passage 210, one part formed of the communication hole 199 is referred to as a straight passage 210*a*, and another part formed of the communication hole 198 is referred to as a straight passage 210*b*.

In a condition where the control valve body 112 of the control valve device 165 is disengaged from the bottom surface of the second hole portion 177 of the inclined hole 175, the large diameter pressurizing chamber 70 communicates with the reservoir R via the first hole portion 176 of the inclined hole 175, the control valve chamber 203, the vertical hole 184, and the communication hole 200. The first hole portion 176 of the inclined hole 175, the vertical hole 184, and the communication hole 200 establish a communication between the large diameter pressurizing chamber 70 and the reservoir R via the control valve chamber 203. Thus, the first hole portion 176 of the inclined hole 175, the vertical hole 184, and the communication hole 200 constitute an relief passage 211 releasing the hydraulic pressure in the large diameter pressurizing chamber 70 to the reservoir R via the control valve device 165. A part of the relief passage 211, which is constituted by the vertical hole 184, extends along the vertical direction.

Further, the first hole portion 191 of the horizontal hole 190 constantly communicates with the relief passage 211 so as to form a communication passage 212 capable of establishing communication between the relief passage 211 and the check valve chamber 206.

Therefore, the check valve chamber 206 of the check valve device 166 communicates with the relief passage 211, and eventually with the reservoir R, via the communication passage 212, and also communicates with the primary hydraulic chamber 61 via the straight passage 210*b* of the small diameter hydraulic passage 210. In other words, the small diameter hydraulic passage 210 connecting the primary hydraulic chamber 61 and the control pressure chamber 204 of the control valve device 165 communicates with the check valve chamber 206, and the straight passage 210*a* and the straight passage 210*b* communicate with each other via the check valve chamber 206. The check valve body 140 accommodated in the check valve chamber 206 permits flow of the brake fluid from the reservoir R to the small diameter hydraulic passage 210 side via the relief passage 211, the communication passage 212 and the check valve chamber 206. Thus, the flow of the brake fluid to the primary hydraulic chamber 61 via the straight passage 210*b* of the small diameter hydraulic passage 210 is permitted. On the other hand, the check valve body 140 prevents flow of the brake fluid in a reverse direction. That is to say, the check valve body 140 prevents flow of the brake fluid from the primary hydraulic chamber 61 to the reservoir R via the straight passage 210*b*, the check valve chamber 206, the communication passage 212, and the relief passage 211.

As a result, when pumping up a brake fluid by a pump of the VDC system (not shown), a suction pressure causes the check valve body 140 to be moved against the bias force of the valve spring 141 so as to open the check valve device 166, and thus allow a large amount of bake fluid to flow from the reservoir R to the primary hydraulic chamber 61 via the relief passage 211, the communication passage 212, the check valve chamber 206, and the straight passage 210*b*.

The control valve device 165 is configured such that the control pressure chamber 204 constantly communicates with the primary hydraulic chamber 61 via the small diameter hydraulic passage 210 and the check valve chamber 206 of the check valve device 166, and a thrust force against the bias force of the valve spring 113, that is to say a thrust force in a direction in which a valve is opened, is generated and applied to the control valve body 112 by the hydraulic pressure in the primary hydraulic chamber 61 and a difference in pressure receiving area between the seal rings 125 and 126. In this way, when the control valve body 112 is moved by this thrust force against the bias force of the valve spring 113, the relief passage 161 is opened. Consequently, the hydraulic pressure in the large diameter pressurizing chamber 70, which communicates therewith via a part of the first hole portion 176 of the relief passage 211, is released to the reservoir R side via the relief passage 211. Herein, the thrust force applied to the control valve body 112 changes in response to the hydraulic pressure in the control pressure chamber 204 to be introduced from the primary hydraulic chamber 61. As a result, the control valve body 112 releases the hydraulic pressure in the large diameter pressurizing chamber 70 to the reservoir R side such that the hydraulic pressure in the large diameter pressurizing chamber 70 is gradually reduced in accordance with a rise in the hydraulic pressure in the primary hydraulic chamber 61.

The inclined hole 175 and the horizontal hole 190 intersect with each other when viewed from the cylinder axis direction, as described above. Accordingly, the moving direction of the control valve body 112, which is slidably guided by the inclined hole 175 and the cap body 105 threadingly engaged therewith, and the moving direction of the check valve body 140, which is slidably guided by the cap body 130 threadingly engaged with the horizontal hole 190, intersect with each other when viewed from the cylinder axis direction.

Further, an extension of the communication hole 198 communicating with the check valve chamber 206 and the primary hydraulic chamber 61 is in a space of the horizontal hole 190, and extends outward through a location in its opening portion 196. Therefore, the straight passage 210*b* which is a part of the small diameter hydraulic passage 210 and is formed of the communication hole 198 connects the check valve chamber 206 and the primary hydraulic chamber 61, and an extension of the straight passage 210*b* is located in a space of the opening portion 196.

In addition, an extension of the communication hole 199 communicating with the check valve chamber 206 and the control pressure chamber 204 is in a space of the inclined hole 175, and extends outward through a location in its opening portion 181. Therefore, the straight passage 210a which is another part of the small diameter hydraulic passage 210 and is formed of the communication hole 199 passes through the control pressure chamber 204 and the check valve chamber 206, and an extension of the straight passage 210a is located in a space of the opening portion 181.

According to the master cylinder 10 of the above-mentioned second embodiment, since the check valve chamber 206 of the check valve device 166 is provided in upper side vertically from the control valve device 165, the control valve device 165 and the check valve device 166 can be provided in a compact arrangement.

Further, since a part of the relief passage 211 is provided along the vertical direction, the air in the check valve device 165 can be effectively bled when the master cylinder 1 is filled with brake fluid.

According to the above-mentioned embodiment, a check valve chamber of the check valve device, which is required to communicate with the reservoir and the small diameter hydraulic chamber, is configured to communicate with the relief passage for releasing the hydraulic pressure in the large diameter pressurizing chamber to the reservoir via the control valve device and with the small diameter hydraulic chamber, respectively. Therefore, the check valve chamber and the reservoir can be connected, not with an exclusive passage, but with the relief passage for releasing the hydraulic pressure in the large diameter pressurizing chamber to the reservoir via the control valve device. That is to say, the relief passage can be shared by the control valve device and the check valve device. Thus, simplification of a passage constitution can be actualized and an increase in a number of manufacturing processes can be controlled so as to increase productivity.

According to the above-mentioned embodiment, since the moving direction of the control valve body of the control valve device and the moving direction of the check valve body of the check valve device intersect, it is possible to design the control valve device and the check valve device to have a compact arrangement.

According to the above-mentioned embodiment, since the small diameter hydraulic passage, which connects the small diameter hydraulic chamber and the control valve device, communicates with the check valve chamber, the reverse checking chamber can be utilized as a part of the small diameter hydraulic passage. Thus, further simplification the passage constitution can be actualized and an increase in a number of manufacturing processes can be further controlled so as to still further increase productivity.

According to the above-mentioned embodiment, since the moving direction of the control valve body of the control valve device is horizontal, and the moving direction of the check valve body of the check valve device is vertical, it is possible to design the control valve device and the check valve device to have a compact arrangement.

According to the above-mentioned embodiment, since the check valve chamber of the check valve device is provided in a lower side vertically from the control valve device, it is possible to design the control valve device and the check valve device to have a compact arrangement.

According to the above-mentioned embodiment, since the check valve chamber of the check valve device is provided in an upper side vertically from the control valve device, it is possible to design the control valve device and the check valve device to have a compact arrangement.

According to the above-mentioned embodiment, since a part of the relief passage is provided along a vertical direction, the air in the control valve device or the check valve device can be bled efficiently when the master cylinder is filled with brake fluid.

According to the above-mentioned embodiment, since the casing of the check valve device and the casing of the control valve device are formed integrally with the stepped cylinder, it is possible to reduce a number of parts, and also to design parts to be compact and to thereby realize a reduction in manufacturing costs.

According to the above-mentioned embodiment, since the communication passage between the relief passage and the check valve chamber is connected with the relief passage via the control valve chamber of the control device, which is connected to the relief passage, the control valve chamber can be shared as a part of the communication passage. Thus, it is possible to further simplify the passage constitution, and additionally to control an increase in a number of manufacturing processes so as to further increase productivity.

According to the above-mentioned embodiment, since a part of the communication passage and the relief passage is a straight passage passing through the control valve chamber and the check valve chamber, these passages can be formed by using only one boring process. Thus, it is possible to control an increase in a number of manufacturing processes to thereby further increase productivity.

According to the above-mentioned embodiment, since a part of the small diameter hydraulic passage is a straight passage connecting the check valve chamber and the small diameter hydraulic chamber, and an extension of the straight passage is located in a space of the opening constituting the check valve chamber, thus the straight passage can be processed by making use of the opening.

According to the above-mentioned embodiment, since the check valve chamber of the check valve device, which is required to communicate with the reservoir and the small diameter hydraulic chamber, is configured to communicate with the small diameter hydraulic passage, which connects the control valve device for releasing the hydraulic pressure in the large diameter pressurizing chamber to the reservoir side such that the hydraulic pressure in the large diameter pressurizing chamber is gradually reduced in accordance with a rise in the hydraulic pressure in the small diameter hydraulic chamber, and with the reservoir, the check valve chamber and the small diameter hydraulic chamber can be connected, not with an exclusive passage, but with the small diameter hydraulic passage connecting the control valve device to the small diameter hydraulic chamber. That is to say, the small diameter hydraulic passage can be shared by the control valve device and the check valve device. Thus, it is possible to simplify the passage constitution, and to control an increase in a number of manufacturing processes so as to increase productivity.

According to the above-mentioned embodiment, since the control valve device has the control pressure chamber connected to the small diameter hydraulic passage so as to apply a force to the control valve body in the valve opening direction, and the small diameter hydraulic passage connecting the control pressure chamber and the small diameter hydraulic chamber provides a communication passage via the check valve chamber, the check valve chamber can be used as a part of the small diameter hydraulic passage. Thus, it is possible to further simplify the passage constitution, and further control an increase in a number of manufacturing processes so as to additionally increase productivity.

According to the above-mentioned embodiment, since a part of the small diameter hydraulic passage is a straight passage through the control pressure chamber and the check valve chamber, the communication passage between the control pressure chamber and the check valve chamber can be formed by using a single boring process. Thus, it is possible to further control an increase in a number of manufacturing processes so as to further increase productivity.

Although only some exemplary embodiments of this invention have been described in detail above, those skilled in the art will readily appreciate that many modifications are possible in the exemplary embodiments without materially departing from the novel teaching and advantages of this invention. Accordingly, all such modifications are intended to be included within the scope of this invention.

The present application claims priority under 35 U.S.C. section 119 to Japanese Patent Application No. 2007-68770, filed on Mar. 16, 2007.

The entire disclosure of Japanese Patent Application No. 2007-68770 filed on Mar. 16, 2007 including specification, claims, drawings and summary is incorporated herein by reference in its entirety.

What is claimed is:

1. A master cylinder comprising:
a stepped cylinder having a large diameter cylinder portion and a small diameter cylinder portion;
a stepped piston having a large diameter piston portion slidably inserted into the large diameter cylinder portion of the stepped cylinder and a small diameter piston portion slidably inserted into the small diameter cylinder portion of the stepped cylinder;
a reverse-flow-checking opening and closing portion for partitioning an inside of the stepped cylinder into a large diameter pressurizing chamber on a large diameter piston portion side and a small diameter hydraulic chamber on a small diameter piston portion side, and permitting a brake fluid to flow only from the large diameter pressurizing chamber side to the small diameter hydraulic chamber side;
a control valve device connecting with the large diameter pressurizing chamber, the small diameter hydraulic chamber and a reservoir, and releasing by a control valve body a hydraulic pressure in the large diameter pressurizing chamber to the reservoir side such that the hydraulic pressure in the large diameter pressurizing chamber is gradually reduced in accordance with a rise in a hydraulic pressure in the small diameter hydraulic chamber; and
a check valve device having a check valve chamber for communicating with a relief passage to release a hydraulic pressure in the large diameter pressurizing chamber via the control valve device to the reservoir and with the small diameter hydraulic chamber, respectively, and a check valve body accommodated in the check valve chamber for permitting a brake fluid to flow from the relief passage to the small diameter hydraulic chamber and preventing flow of the brake fluid flow in the reverse direction.

2. The master cylinder of claim 1, wherein a moving direction of the control valve body of the control valve device intersects with a moving direction of the check valve body of the check valve device.

3. The master cylinder of claim 1, wherein a small diameter hydraulic passage connecting the small diameter hydraulic chamber with the control valve device communicates with the check valve chamber.

4. The master cylinder of claim 1, wherein a moving direction of the control valve body of the control valve device is a horizontal direction, and a moving direction of the check valve body of the check valve device is a vertical direction.

5. The master cylinder of claim 1, wherein the check valve chamber of the check valve device is provided in a lower side vertically from the control valve device.

6. The master cylinder of claim 1, wherein the check valve chamber of the check valve device is provided in an upper side vertically from the control valve device.

7. The master cylinder of claim 1, wherein a part of the relief passage is provided along a vertical direction.

8. The master cylinder of claim 1, wherein a casing of the check valve device and a casing of the control valve device are integrally formed with the stepped cylinder.

9. The master cylinder of claim 5, wherein the control valve device has a control valve chamber connecting with the relief passage and accommodating the control valve body, and a communication passage providing a communication between the relief passage and the check valve chamber is connected to the relief passage via the control valve chamber.

10. The master cylinder of claim 9, wherein a part of the communication passage and the relief passage is a straight passage passing through the control valve chamber and the check valve chamber.

11. The master cylinder of claim 5, wherein:
the check valve chamber of the check valve device has an opening portion which is opened at its lower side in a vertical direction, and the opening portion is closed by a cap body;
a part of the small diameter hydraulic pressure passage is a straight passage connecting the check valve chamber and the small diameter hydraulic chamber; and
an extension of the straight passage is located in a space of the opening portion.

12. A master cylinder comprising:
a stepped cylinder having a large diameter cylinder portion and a small diameter cylinder portion;
a stepped piston having a large diameter piston portion slidably inserted into the large diameter cylinder portion of the stepped cylinder and a small diameter piston portion slidably inserted into the small diameter cylinder portion of the stepped cylinder;
a reverse-flow-checking opening and closing portion for partitioning an inside of the stepped cylinder into a large diameter pressurizing chamber on a large diameter piston portion side and a small diameter hydraulic chamber on a small diameter piston portion side, and permitting a brake fluid to flow only from the large diameter pressurizing chamber side to the small diameter hydraulic chamber side;
a control valve device connecting with the large diameter pressurizing chamber, the small diameter hydraulic chamber and a reservoir, and releasing by a control valve body a hydraulic pressure in the large diameter pressurizing chamber to the reservoir side such that the hydraulic pressure in the large diameter pressurizing chamber is gradually reduced in accordance with a rise in a hydraulic pressure in the small diameter hydraulic chamber; and
a check valve device having a check valve chamber for communicating with a small diameter hydraulic passage connecting the small diameter hydraulic chamber to the control valve device, and with the reservoir, respectively, and a check valve body accommodated in the check valve chamber for permitting flow of a brake fluid flow from the reservoir side to the small diameter hydraulic passage, and preventing flow of the brake fluid in a reverse direction.

13. The master cylinder of claim 12, wherein the control valve device has a control pressure chamber connecting with the small diameter hydraulic passage and applying a pressure to the control valve body in a valve opening direction, and the small diameter hydraulic passage connecting the control pressure chamber to the small diameter hydraulic chamber provide communication via the check valve chamber.

14. The master cylinder of claim 13, wherein a part of the small diameter hydraulic passage is a straight passage passing through the control pressure chamber and the check valve chamber.

* * * * *